United States Patent [19]

Alexander, Jr.

[11] Patent Number: 6,083,353
[45] Date of Patent: Jul. 4, 2000

[54] HANDHELD PORTABLE DIGITAL GEOGRAPHIC DATA MANAGER

[75] Inventor: John F. Alexander, Jr., Gainesville, Fla.

[73] Assignee: University of Florida, Gainesville, Fla.

[21] Appl. No.: 08/925,836

[22] Filed: Sep. 5, 1997

Related U.S. Application Data

[60] Provisional application No. 60/025,528, Sep. 6, 1996.

[51] Int. Cl.[7] .................................................. G01S 5/02
[52] U.S. Cl. .............................. 202/158; 382/276
[58] Field of Search ...................... 382/276; 701/213; 702/158

[56] References Cited

U.S. PATENT DOCUMENTS

| | | | |
|---|---|---|---|
| 5,488,558 | 1/1996 | Ohki | 364/449 |
| 5,528,248 | 6/1996 | Steiner et al. | 342/357 |
| 5,528,518 | 6/1996 | Bradshaw et al. | 364/561 |
| 5,568,152 | 10/1996 | Janky et al. | 342/357 |
| 5,586,063 | 12/1996 | Hardin et al. | 364/561 |
| 5,696,705 | 12/1997 | Zyban | 364/561 |
| 5,825,480 | 10/1998 | Udagawa | 356/138 |
| 5,835,057 | 11/1998 | Van Heyningen | 342/359 |
| 5,844,505 | 12/1998 | Van Ryzin | 340/988 |

FOREIGN PATENT DOCUMENTS

| | | | |
|---|---|---|---|
| 0383114 | 8/1990 | European Pat. Off. | G05D 1/08 |
| 9516895 | 6/1995 | WIPO | G01C 11/00 |

OTHER PUBLICATIONS

Patent Abstracts of Japan, vol. 096, No. 008, Aug. 30, 1996 & JP 08 097927 A (Blue Line Shiya:KK), Apr. 12, 1996.

*Primary Examiner*—Timothy P. Callahan
*Assistant Examiner*—Linh Nguyen
*Attorney, Agent, or Firm*—Saliwanchik, Lloyd & Saliwanchik

[57] ABSTRACT

The subject invention provides devices and methods for efficiently and accurately gathering image and other field data using a handheld portable Geographic Data Manager (GDMs). The subject GDMs can utilize a combination of GPS antennas and receivers, digital compasses, inclinometers, gyroscopes, and digital cameras to gather, process, and/or store data which can provide the position and other geographic data and information pertaining to objects of study. The subject GDMs can have application to fields including environmental sampling, surveying, agriculture field data collection, property appraisal, law enforcement, and construction inspection.

38 Claims, 21 Drawing Sheets

HANDHELD PORTABLE DIGITAL GEOGRAPHIC DATA MANAGER

CROSS-REFERENCE TO A RELATED APPLICATION

This application claims the benefit of the filing date of U.S. Provisional Application Ser. No. 60/025,528 filed on Sep. 6, 1996.

BACKGROUND OF THE INVENTION

It is often necessary for insurance adjusters, geophysicists, construction workers, real estate developers, and others working in the field to gather and assimilate geographic, topographic, visual (i.e., photographic),and other information about a site. These sites may be in locations which are remote and/or have no readily available access to computers or even power sources. Currently, there is no handheld portable device for gathering and processing such information.

Printed maps are available for viewing almost all features that have geographical locations. A limitation of printed maps is that a user must manually sort through the entire map in order to find the relevant geographical features. Electronic maps have recently become available to replace paper maps for some applications. A map database is stored in a memory storage device as a bit map or as vectors that point to a map character.

Many electronic location determination systems are available or have been proposed to provide electronic location information to a user equipped with a location determination receiver. Ground-based location determination systems are well known and include systems that were developed primarily for communications, such as cellular telephone, FM broadcast, and AM broadcast.

The Global Positioning System (GPS) is a global navigation system that enables the user to utilize signals broadcast from satellites in order to identify positions. GPS systems are well known and widely used to accurately locate specific positions. GPS systems, which utilize a network of satellites to identify locations on the ground, are widely used in automotive and nautical navigation, construction, mining, and farming, as well as in a variety of other applications. See, for example, U.S. Pat. No. 5,528,248 and PCT Application No. WO 95/05686. Other satellite positioning systems, such as the Global Orbiting Navigational System (GLONASS) are also known. Cartographers, utilities operators, wildlife managers, and others have used GPS technology in conjunction with Geographical Information Systems (GIS) to augment map making procedures and other field work, particularly in remote locations. In such applications, there has been an increasing use of computers to facilitate data storage and retrieval.

Personal Digital Assistant (PDA) is a generic name for a handheld personal computing device having a volume in the range of about 200 to 1200 cubic centimeters. PDAs can have as much computing power as some desktop personal computers and have been used in a wide variety of applications, including mapping.

Unfortunately, hardware and software hurdles have limited the ability to utilize multicomponent data gathering systems in the field. Connecting equipment such as a GPS, a two-way radio, and a handheld pen computer for use in the field poses a number of obstacles. Many wires and cables work fine on a desktop computer but not on a handheld device. The essence of the subject invention is the development of a rugged, fully-integrated, easy to use handheld multicomponent field data gathering system for gathering positional, image, and other data, and simultaneously processing this information.

BRIEF SUMMARY OF THE INVENTION

The subject invention concerns methods and devices which aid in collecting and verifying planning and engineering field data. The devices of the subject invention, which can be handheld, portable, and digital, can be referred to as Geographic Data Managers (GDMs). The GDMs of the subject invention are designed to meet the needs of, for example, the construction and utility industries. The methods and devices of the subject invention are also applicable to other tasks such as environmental sampling, surveying, agricultural field data collection, property appraisal, law enforcement, and construction inspection. Specific applications include the gas, water, sewer, telephone, and cable TV utilities; local, state, and federal government inspection agencies; and the insurance and transportation industries.

The GDMs of the subject invention comprise multiple components interfaced with, for example, a central processing unit (CPU). Preferably, these multiple components include at least one digital camera, at least one GPS receiving antenna, a GPS processing component, wireless radio communication capability, a digital compass with inclinometer, and user interaction capability. In a preferred embodiment of the subject invention, the GDM comprises at least two digital cameras which facilitate the determination of the distance from the GDM to an object. In a specific embodiment, a digital compass and an inclinometer of the GDM can enable the determination of the orientation of the camera so that the exact location of an object which appears in the images from the digital cameras can be readily determined.

The subject GDM can be utilized in applications where the determination of an object's location in two-dimensions is required, for example when the height of the object is not needed. In a specific embodiment, the subject GDM can be equipped with two GPS antennas and two cameras which can allow the determination of the object's location in two dimensions. In this embodiment, the two GPS antennas can be offset such that a heading and position of the GDM can be determined and the two digital cameras can provide the distance to the object, thus providing data needed to determine the object's location in two dimensions. Alternatively, a compass can provide the heading and two cameras can be used to provide the distance to the object from the location of the GDM. In another alternative embodiment, for example, if the direction of an object is known, an inclinometer and the two digital cameras can provide pitch and distance data which can be used to determine the height and distance to the object from the location of the GDM.

In a preferred embodiment, the subject GDM can comprise at least three GPS antennas and corresponding receivers, wherein the GPS antennas are in a plane. The receipt of the signal from one GPS satellite by all three of the GPS antennas can provide information with respect to heading, pitch, and roll of the GDM, as well as location. Accordingly, when this information is combined with the distance information determined from the images from the at least two cameras, the GDM can provide information as to the exact location, in three dimensions, of the imaged object. Advantageously, the combination of the three GPS antennas can provide a more accurate determination of the GDM location due to receipt of the GPS signals by all three GPS antennas in a plane.

In another specific embodiment, the subject GDM can comprise at least one gyroscope, for example a laser gyroscope, which can provide data related to the GDM's heading, pitch and/or roll. Advantageously, a laser gyroscope can be less susceptible to confusion by metals than a compass, In addition, a gyroscope can be calibrated from data received from the GPS when the GDM's GPS antenna is moving.

In a further embodiment, the subject GDM can be incorporated with another structure, for example a vehicle. This other structure can incorporate at least one GPS antenna and a means for providing data to the GDM with respect to the GPS antenna's position relative to the GDM's camera(s). This embodiment can be useful when the GDM is used, for example near tall buildings, where the GPS satellite signals can bounce off and/or be blocked. The GDM can also have a means for mounting to the structure, for example a vehicle, such that its location relative to the structure is known. In a specific embodiment, the GPS antennas can be mounted on the structure in order to allow a greater distance between the antennas and, therefore more accurate distance determinations.

In a preferred embodiment of the subject invention, the GDM comprises capability for wireless transmission 26 of data to a host computer at a remote location. The GDM of the subject invention can further comprise a touch screen controller 28 and/or a voice controller 30. Preferably, the GDM of the subject invention further comprises a power source. This power source may be, for example, a battery pack and any necessary electrical components to modulate the current so that it is compatible with the requirements of the various data gathering and processing components.

In a preferred embodiment, the integrated handheld field digital data mapping device of the subject invention is capable of:

(1) collecting and mapping global position system (GPS) data;
(2) reporting GPS location, speed, and direction in a seamless fashion;
(3) reporting orientation including magnetic direction, pitch, and roll;
(4) collecting multiple pairs of color, or grey level, digital images (photographs) used to measure distance to an object;
(5) voice command and voice query;
(6) touch sensitive icon control;
(7) providing icon-driven notes relating to field observations;
(8) two-way wireless data transfer with host database station;
(9) mapping the present environment in points, lines, and area features;
(10) providing navigation assistance to a desired location;
(11) power management to allow a battery pack to provide power to various components;
(12) collecting infrared images;
(13) bar code reading;
(14) voice/audio annotating;
(15) video annotating;
(16) WEB/Ethernet phone function;
(17) fingerprint recognition;
(18) digital inking;
(19) native methods/Applets as internet compliant design;
(20) ethernet;
(21) PC card; and
(22) touch/pen input.

DETAILED DISCLOSURE OF THE INVENTION

The subject invention provides a system design, materials and methods which are highly advantageous in collecting and utilizing field data for use in a wide variety of applications. The Geographic Data Manager (GDM) of the subject invention is a multi-component system for gathering positional, image, and other data, and simultaneously processing this information. The subject invention is also applicable to other tasks such as construction and utility monitoring, environmental sampling, surveying, agricultural field data collection, law enforcement, public safety, and property appraisal. Specific applications include the gas, water, sewer, telephone, and cable TV utilities; local, state, and federal government inspection agencies; and the insurance and transportation industries.

Figure 17:
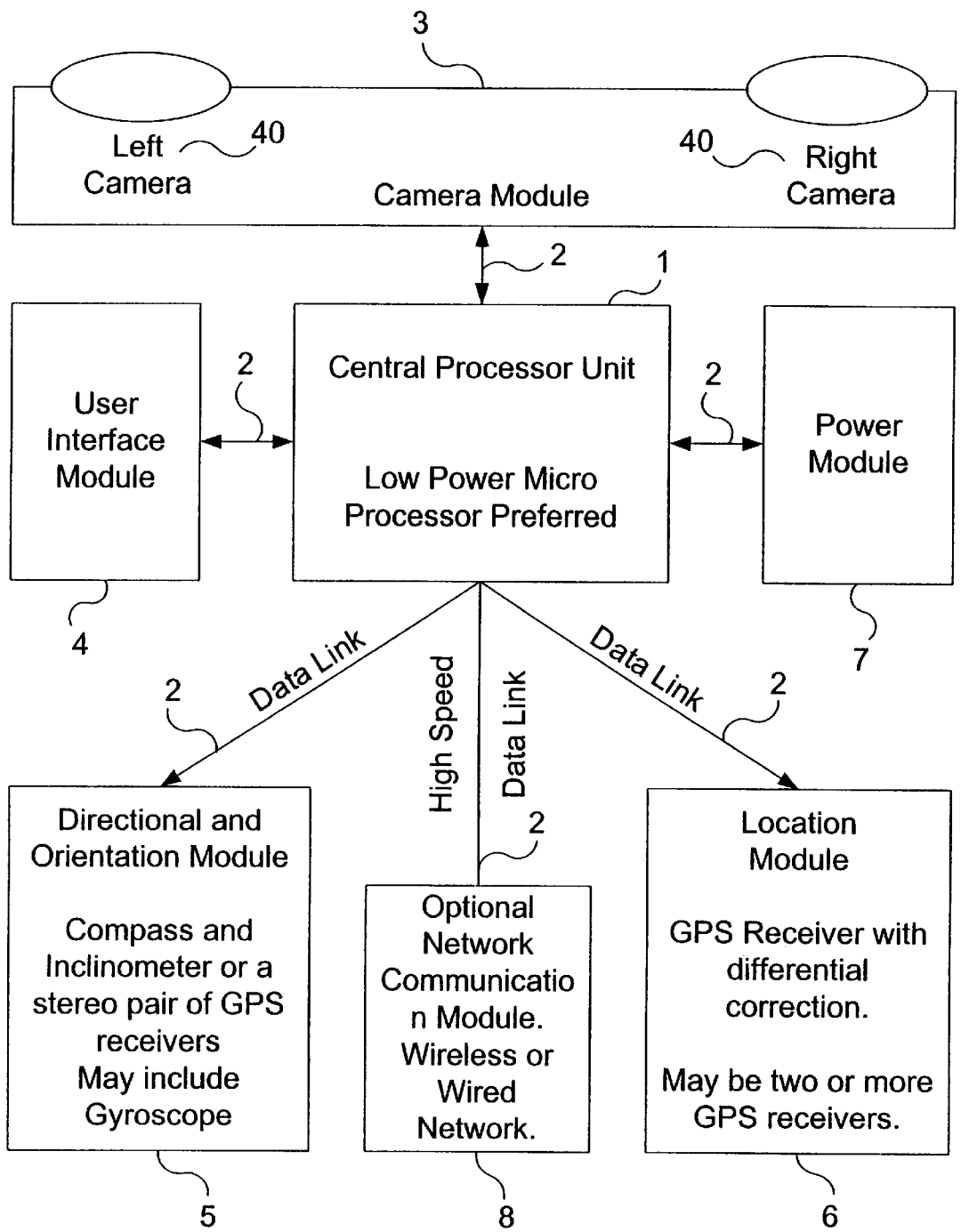
FIG. 17 shows the basic functional modules of a GDM, in accordance with the subject invention.
Figure 18:
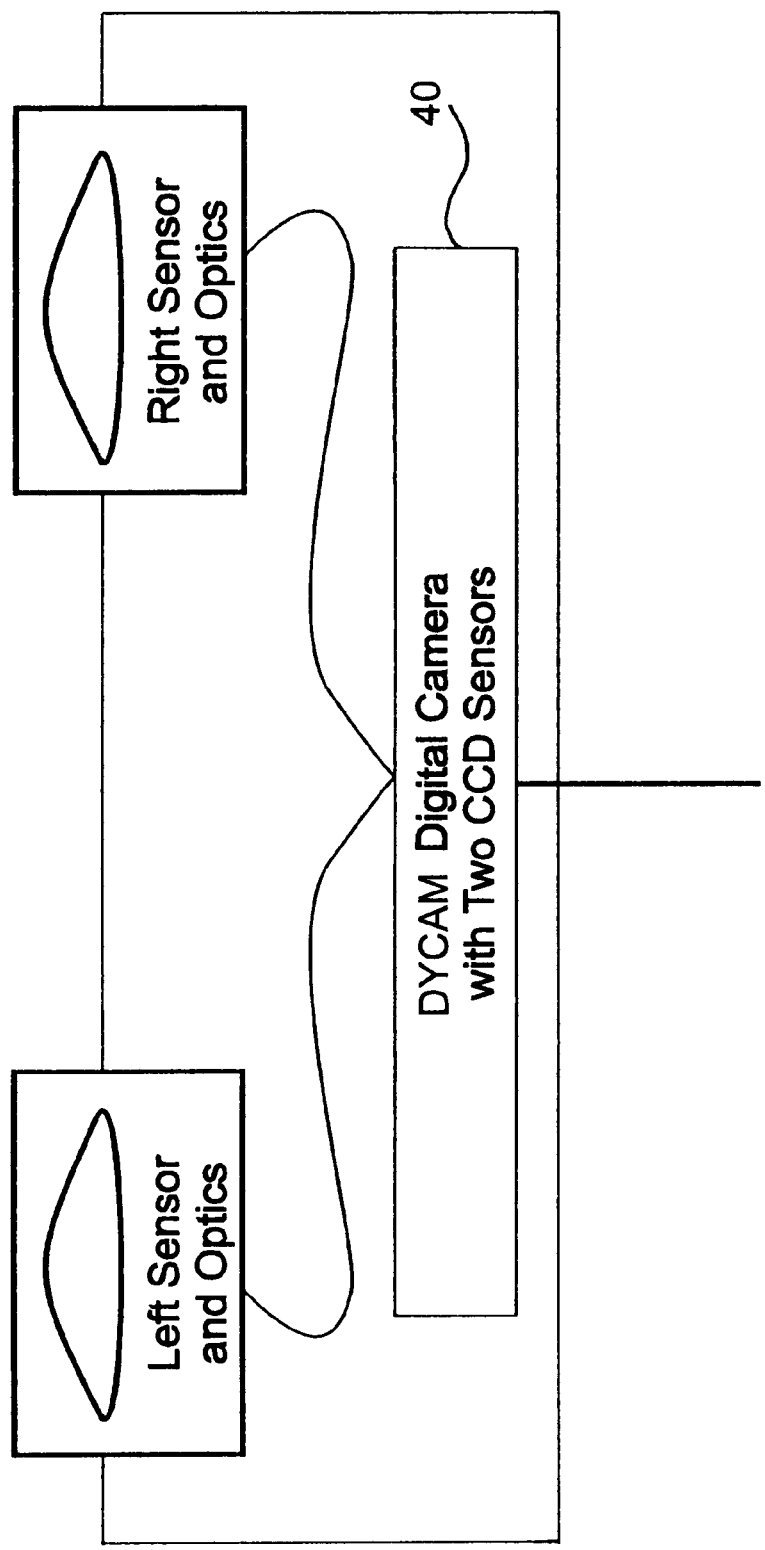
FIG. 18 illustrates a camera module of a GDM, in accordance with the subject invention, which utilize a Dycam digital camera with two CCD sensors.

Referring to FIG. 17, a block diagram is shown illustrating the main functional blocks of the subject invention. In a preferred embodiment, the GDM of the subject invention comprises a central processor unit (CPU) 1, preferably a low power microprocessor, which coordinates the transmission and receipt of data and commands from the other system components and processes the data gathered, stored, and/or processed, in order to provide data needed during the operation of the subject GDM. High speed data links 2 can link the central processor unit 1 to the camera module 3, a user interface module 4, a directional and orientation module 5, a location module 6, a power module 7, and an optional network communication module 8.

The camera module 3 can gather data representing digital images of objects under study. The camera module 3 can receive control signals from the CPU 1 and send data representing digital images to the CPU 1 for storage and/or processing. The user interface module 4, connected to the CPU 1 by a high speed data link 2, allows a user to interface with the GDM. The user interface 4 can allow a user to view images stored in the GDM, an object currently in the camera(s) view, and/or icons which can allow the user to control the operation of the GDM. The user interface 4 can utilize voice recognition and commands, a heads up display, computer display flat panel with pen or touch input, and/or various other user interfaces.

The directional and orientation module 5, connected to the CPU 1 by a high speed data link 2, supplies data to the CPU 1 which is used to determine the heading, pitch, and/or roll of the GDM and can also receive data from the CPU 1. For example, the CPU 1 can send data which the CPU 1 receives from the location module 6, which can be useful in calibration of the equipment of the directional and orientation module 5. Compasses, inclinometers, gyroscopes, and/or combinations of GPS receivers can be utilized for collection data which is relevant to the direction and orientation of the GDM.

The location module 6, connected to the CPU 1 by a high speed data link 2, gathers and sends data to the CPU 1 which can be utilized to determine the location of the GDM. The location module 6 can utilize a variety of systems to gather this data, including, for example, satellite and/or ground based positioning systems. In a preferred embodiment of the subject invention, the location module utilizes GPS antennas and receivers 32 to receive satellite signals which allow the CPU 1 to determine the position of the GDM. In specific embodiments, the directional and orientation module 5 and the location module 6 can be combined, for example when three GPS antennas and receivers 32 are utilized to provide data relevant to position, pitch, and/or roll of the GDM.

The optional network communication module 8, connected to the CPU 1 by a high speed data link 2, can be utilized to enable the GDM to communicate with remote facilities, for example a home office computer which can receive and send data from and to the GDM. The network communication module 8 can utilize, for example, wireless or wired networks. In a specific embodiment, at least two GDMs can communicate with each other via network communication modules, for example, to transfer data.

The handheld data gathering device of the subject invention can, in a preferred embodiment, comprise:

(a) An imbedded computer capable of storing and processing image data and interfacing to multiple data sensing modules. The user sees the graphical and alpha numeric results on a LCD or appropriate display with pen and/or touch screen input, either color or black and white. The user controls the system through touching or pointing to action icons or via voice commands. Alternatively, a mouse and keyboard may be used for more conventional user input and control of the system (b) A global position receiver (GPS) 32 capable of accurately capturing geographic location with post processing or real-time differential correction capability. Better than one meter accuracy can be achieved with such a system. An interface from the GPS to the central computer to process the location data and the necessary software to display and record the results. Differential correction of GPS data is used to improve the accuracy either real-time or post processing as available.

(c) A digital compass 34 capable of providing accurate heading. Other devices capable of providing heading, for example, a gyroscope 38 or a pair of GPS receivers 32, can be used to calculate heading. A gyroscope 38 can be calibrated from heading obtained from the GPS receiver when the GDM is moving. In a specific embodiment, a digital compass can be utilized with an error of less than about one degree. An interface from the digital heading device to the central processor and software capable of processing and displaying and storing the direction or heading information.

(d) Means capable of providing accurate pitch and roll data, for example digital inclinometers 36. Accurate pitch and roll data, for example less than one degree of error, for a plane parallel to the center line of the camera's field of view can aid in resolving the exact location of the object under observation. For example, available digital inclinometers can be utilized with an error of less than about one degree. A gyroscope type device and/or a set of GPS receivers can also be used to collect real-time orientation data. The interface from, for example, an inclinometer, to the imbedded computer transfers the pitch and roll data. The system software is responsible for processing, displaying and storing the pitch and roll data. It also makes the data available for use in calculating new coordinates.

(e) A pair of digital cameras 40 with matched optics mounted with the lenses in the same plane and with the line through the center of view of each lens parallel to the line through the other. An interface from the cameras to the imbedded computer processor and software capable of displaying, processing, and storing the images.

(f) Stereo image processing software or hardware algorithms capable of locating a selected object in one image in the stereo image pair. Once the object is located in the stereo pair image the displacement between the two objects is used in conjunction with the optical characteristics of the lenses and the spacing of the lenses to calculate distance to the object of interest. Accuracy of plus or minus one inch can be achieved at fifteen feet, and about plus or minus a foot at thirty feet can be readily achieved using lenses which are only about nine inches apart. The distance accuracy drops off as the distance increases; however, longer range accuracy is achieved by sliding the cameras out to a wider spacing and/or attaching telephoto lenses to the cameras. For example, a 2x telephoto lens makes the accuracy plus or minus one inch at 30 feet. The GDM can be made with lenses spaced at nine inches to keep the handheld unit small; however, when extended to 18 inches the accuracy is increased. The GDM can have a horizontal resolution of 640 pixels. Image sensors with a higher resolution also increase distance accuracy. For maximum distance accuracy a higher resolution sensor is used in conjunction with widely spaced lenses and telephoto lenses (g) In addition to simple distance measurement and range finding to locate an object of interest to the user the pair of stereo images collected can be used 25 to measure objects of interest in the field or at a later time by storing the optical characteristic of the lenses and the lenses spacing with the stereo pair of images produced.

(h) Data stored in the system in the PC Card or appropriate computer storage medium can be sent to a base unit via a wireless network which can be made up of two-way digital packet radios or analog or digital cell phones. Alternatively, data can be exchanged via an infrared link, a serial cable, a modem on the phone system, a wired network connection, Ethernet, a PC Card, a floppy disk, or other available channels.

(i) Voice communications between units can be provided over the digital data link to aid in coordination activity of the users in the field.

(j) The software of the prototype system is designed to enhance the use of the Internet base world wide web. A real time operating system can be used to manage each of the devices such as the cameras 40; GPS or multiple GPS receivers 32; the direction and orientation devices; the wireless or wired network interface, the battery and power management subsystem; the graphics display; and the audio input and output devices. In the prototype system Java native methods are provided for each device. For example there is a Camera object which provides the Web based Java program with stereo digital image pairs and range finding calculations.

(k) A power management system designed to maximize the usable battery life of the GDM by regulating the use of power by the main computer system as well as each of the data collection subsystem devices.

Figure 2:
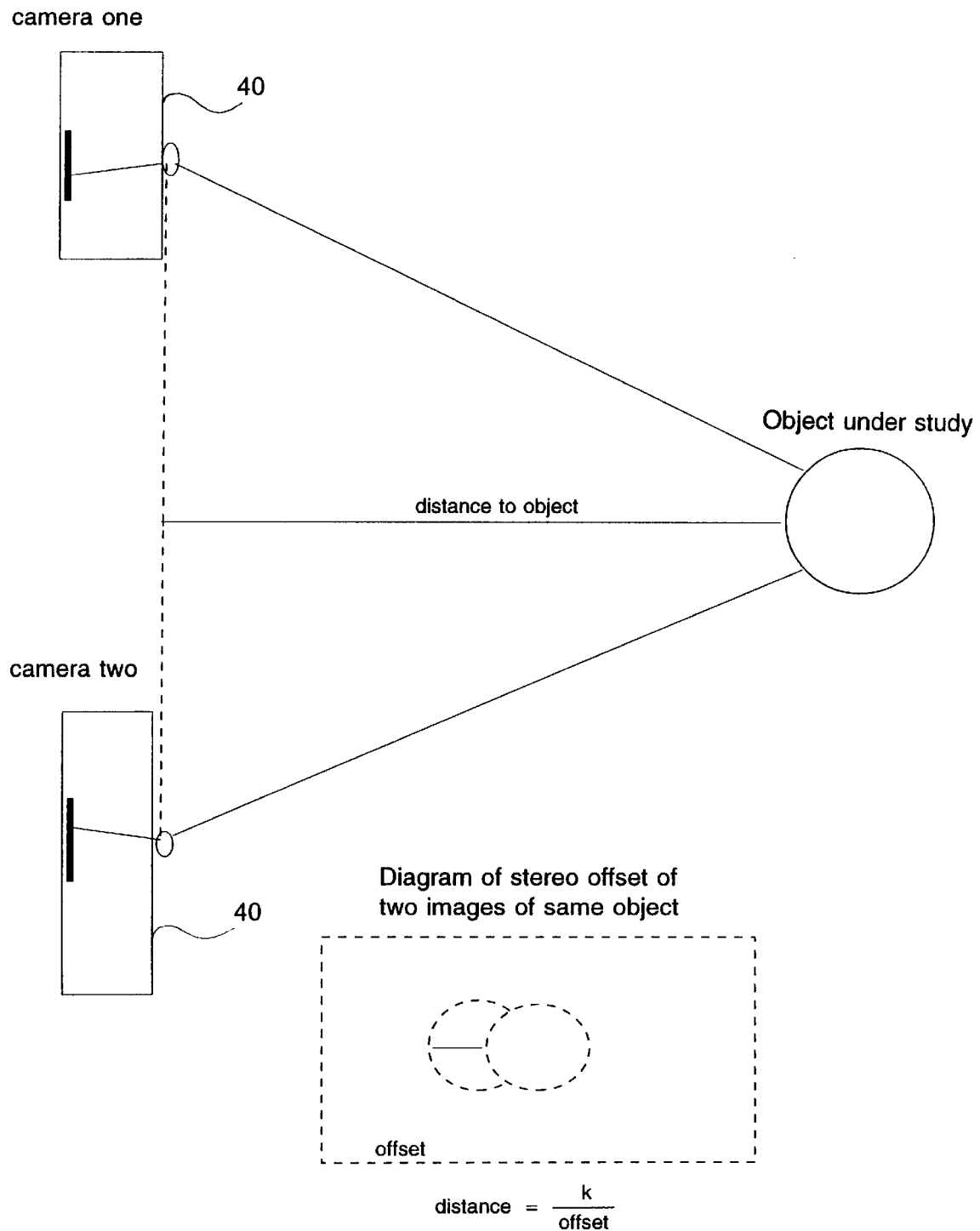
FIG. 2 is a schematic showing the determination of the distance to an object from the device of the subject invention using the images produced by two digital cameras.

In a preferred embodiment, the GDM of the subject invention utilizes a pair of digital cameras 40 which are not only able to provide photographic images of sites of interest but also to facilitate the determination of the distance from the GDM to any object in the images produced by the digital cameras. The distance determination can be carried out by the GDM utilizing a software program which compares the images produced by the two cameras in order to determine the distance apart a single object is in the two images. Referring to FIG. 2, this distance apart in the images is directly proportional to the distance that the object is from the GDM. The distance to an object can be determined from the following relationship:

$$d_o = \frac{fd_c}{d_i}$$

where $d_o$ is the distance to the object, $d_c$ is the spacing between the cameras, $d_i$ is the offset of the two images of the object from the cameras, and f is the focal length of the cameras' lenses.

Through a series of straightforward computational steps, the GDM of the subject invention analyzes the distance between the object's images and converts this to the distance from the GDM to the object.

In a preferred embodiment, the subject GDM can have stereo camera lenses which are precisely rotated on an axis through a line through the center of the optics of each lens. Rotation of the lenses such that each points toward the object under study can allow a more precise determination of the distance to an object. In this embodiment, the first image set can be taken with the lenses parallel. The distance to the object can be calculated and this distance used to compute the angle of rotation for each lense. The two images of the same object are then matched by small changes in the angle of rotation. The final range can be calculated utilizing the angle of rotation of the lenses.

In a preferred embodiment, the GDM simultaneously records the pitch and roll of the GDM as determined by, for example, an inclinometer, and it records the magnetic direction of the GDM as determined, for example, by a digital compass. This information, together with the GPS information, are all processed essentially simultaneously by the CPU and can be, for example, transmitted to a remote host computer by wireless communication components.

The following two tables illustrate the accuracy of distance determination utilizing two specific embodiments of the subject invention. In these tables, one pixel depth gives the range expected error for one pixel alignment accuracy of the image.

TABLE 1

| Range To Target In Meters | Image target offset in mm | Image target offset in pixels | One pixel depth Meters | View frame in Meters |
|---|---|---|---|---|
| 3 | 2 | 363 | 0.008 | 0.88 by 0.60 |
| 5 | 1.2 | 218 | 0.021 | 1.45 by 1.1 |
| 10 | 0.6 | 110 | 0.090 | 2.9 by 2.2 |
| 25 | 0.24 | 43 | 0.51 | 7.5 by 5.5 |
| 50 | 0.12 | 22 | 2.0 | 14.5 by 11 |

TABLE 2

| Range To Target In Meters | Image Target Offset in mm | Image Target Offset In Pixels | One Pixel Depth Meters | View Frame In Meters |
|---|---|---|---|---|
| 10 | 2.4 mm | 436 | 0.0225 | 2.96 by 2.2 |
| 25 | 0.96 mm | 175 | 0.1273 | 7.5 by 5.5 |

TABLE 2-continued

| Range To Target In Meters | Image Target Offset in mm | Image Target Offset In Pixels | One Pixel Depth Meters | View Frame In Meters |
|---|---|---|---|---|
| 50 | 0.48 | 86 | 0.50 | 14.5 by 11 |
| 100 | 0.24 | 22 | 2.00 | 29 by 22 |

Table 1 is for 12 mm lenses set at 500 mm lenses spacing and a 0.0055 mm per pixel CCD sensor, which can be utilized in a handheld GDM in accordance with the subject invention. Table 2 is for 12 mm lenses set at 2 meter lense spacing and a 0.0055 mm per pixel CCD sensor, which can be utilized in a vehicle mounted GDM in accordance with the subject invention.

Figure 19:
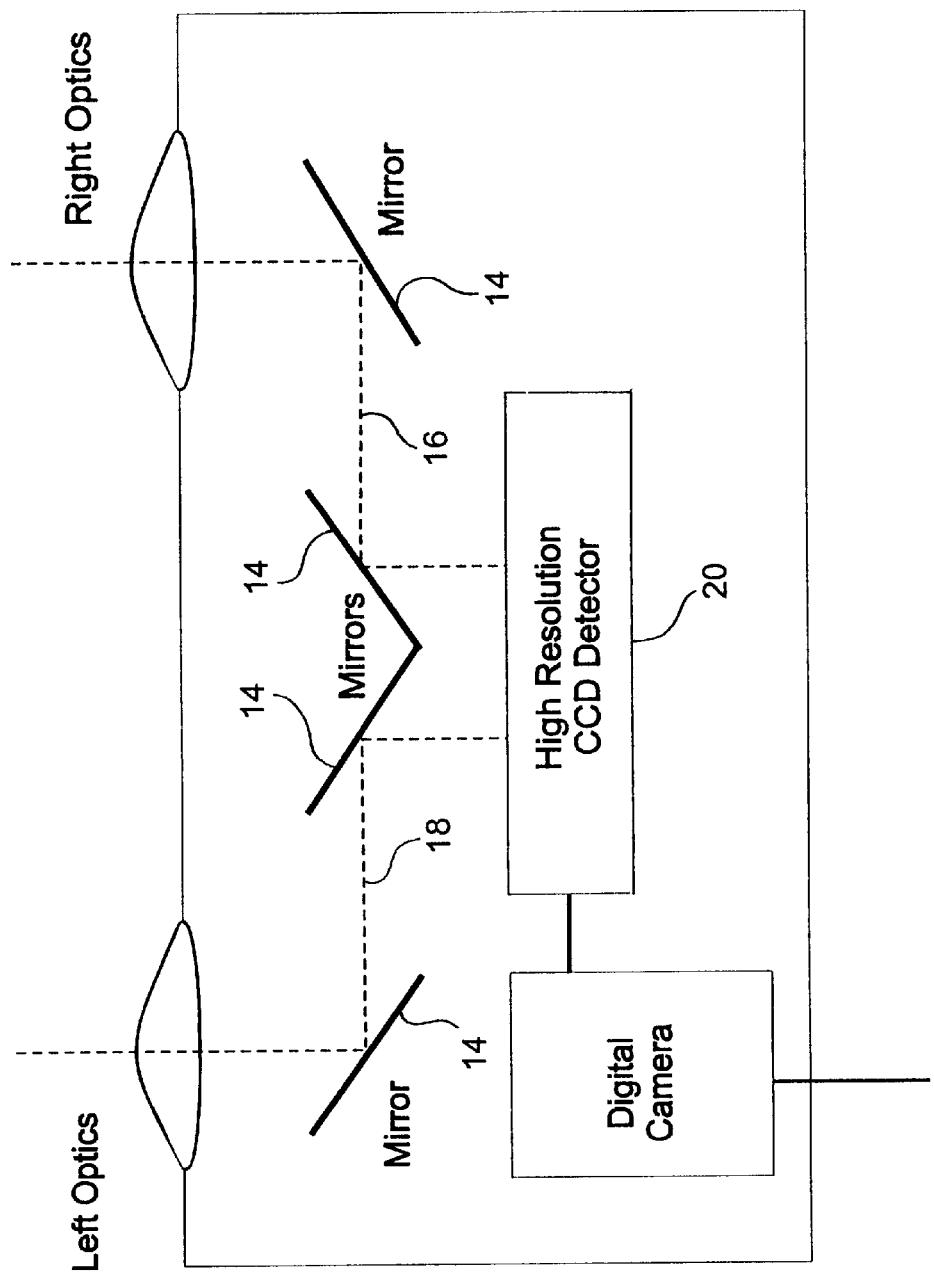
FIG. 19 illustrates a camera module of a GDM, in accordance with the subject invention, which utilizes mirrors to relay an image from the left optics and an image from the right optics to a high resolution CCD detector.
Figure 20:
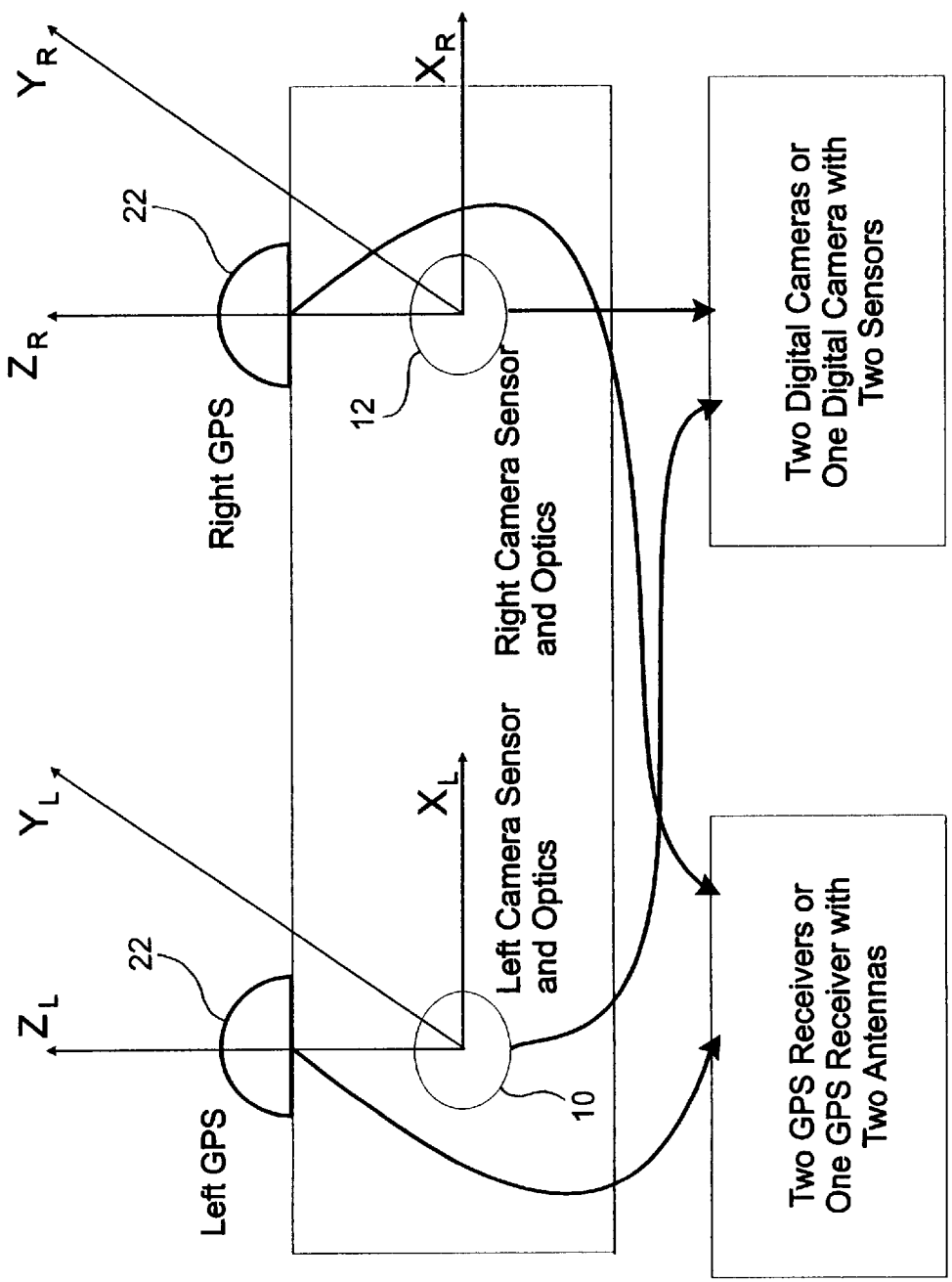
FIG. 20 illustrates an embodiment of a GDM, in accordance with the subject invention, which utilizes two GPS antennas and two image gathering optics.

A variety of options relating to imaging optics can be utilized in accordance with the subject invention. Referring to FIG. 20, a left camera sensor and 10 optics and a right camera sensor and optics 12 can feed two digital cameras, each having a sensor, or one digital camera having two sensors. Referring to FIG. 19, mirrors 14 can be used to guide the right 16 and left 18 images to a single high resolution CCD detector 20. Other variations can be readily utilized by one skilled in the art having the benefit of the instant disclosure.

The GDM of the subject invention can further comprise a display screen and a means for the operator to interact with the GDM. This means of interaction may be, for example, by a touch screen, by voice recognition, or by a traditional keyboard.

A person skilled in this art having the benefit of the instant disclosure would readily appreciate that a variety of modifications could be made to the specific embodiments exemplified herein without departing from the spirit of the instant invention. For example, the GPS function of the GDM is for the purpose of providing a location for the GDM. This function could be performed by other locating means including, but not limited to, other satellite positioning systems and ground-based systems. Certainly, when the device of the subject invention is to be used indoors or in the vicinity of tall buildings, it may be advantageous to use a ground-based location system rather than a satellite system. Also, the device could display a map which the user could touch or in some other way designate the location of the GDM. In yet another embodiment, the GDM may be stationary, in which case its position will be known.

The subject GDM can be utilized in applications where the determination of an object's location in two-dimensions is required, for example when the height of the object is not needed. In a specific embodiment, referring to FIG. 20, the subject GDM can be equipped with two GPS antennas 22 and two cameras 10 and 12 which can allow the determination of the object's location in two dimensions. In this embodiment, the two GPS antennas 22 can be offset such that a heading and position of the GDM can be determined and the two digital cameras 40 can provide the distance to the object, thus providing data needed to determine the object's location in two dimensions. Alternatively, a compass can provide the heading and two cameras can be used to provide the distance to the object from the location of the GDM. In another alternative embodiment, for example, if the direction of an object is known, an inclinometer and the two digital cameras can provide pitch and distance data which can be used to determine the height and distance to the object from the location of the GDM.

In a preferred embodiment, the subject GDM can comprise at least three GPS antennas and corresponding receivers, wherein the GPS antennas are in a plane. The receipt of the signal from one GPS satellite by all three of the GPS antennas can provide information with respect to pitch and roll of the GDM, as well as location. Accordingly, when this information is combined with the distance information determined from the images from the at least two cameras, the GDM can provide information as to the exact location, in three dimensions, of the imaged object. Advantageously, the combination of the three GPS antennas can provide a more accurate determination of the GDM location due to receipt of the GPS signals by all three GPS antennas in a plane.

Figure 21:
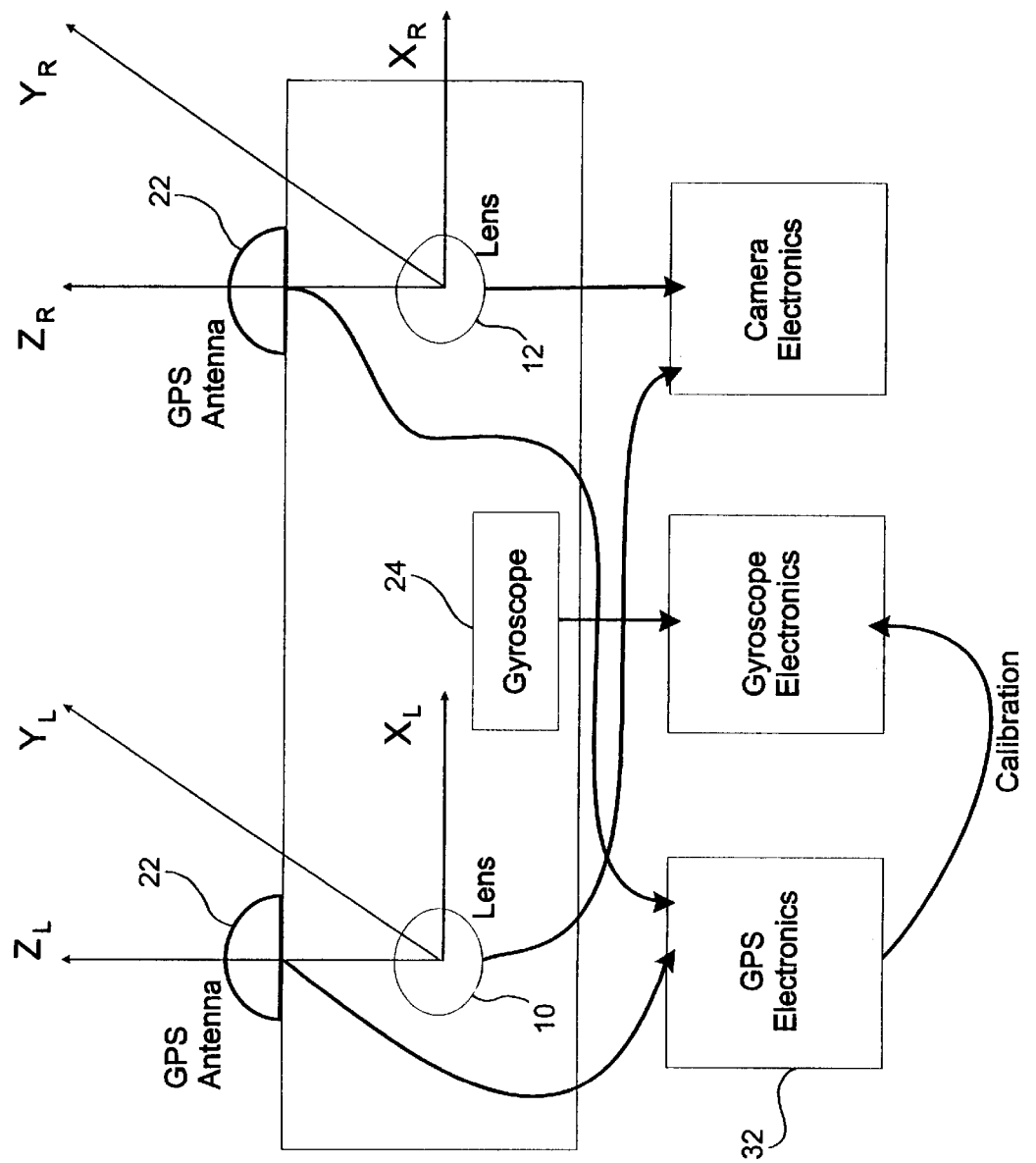
FIG. 21 illustrates an embodiment of a GDM, in accordance with the subject invention, which utilizes a gyroscope to provide data related to the GDMs heading, pitch, and/or roll.

In another specific embodiment, referring to FIG. 21, the subject GDM can comprise at least one gyroscope, for example a laser gyroscope 24, which can provide data related to the GDM's heading, pitch and/or roll. Advantageously, a laser gyroscope can be less susceptible to confusion by metals than a compass. In addition, a gyroscope can be calibrated from data received from the GPS when the GDM's GPS is moving.

In a further embodiment, the subject GDM can be incorporated with another structure, for example a vehicle. This other structure can incorporate at least one GPS antenna and a means for providing data to the GDM with respect to the GPS antenna's position relative to the GDM's camera(s). This embodiment can be useful when the GDM is used, for example near tall buildings, where the GPS satellite signals can bounce off and/or be blocked. The GDM can also have a means for mounting to a structure, for example a vehicle, such that its location relative to the structure is known. In a specific embodiment, the GPS antennas can be mounted on a structure in order to allow a greater distance between the antennas and, therefore more accurate distance determinations.

Figure 16:
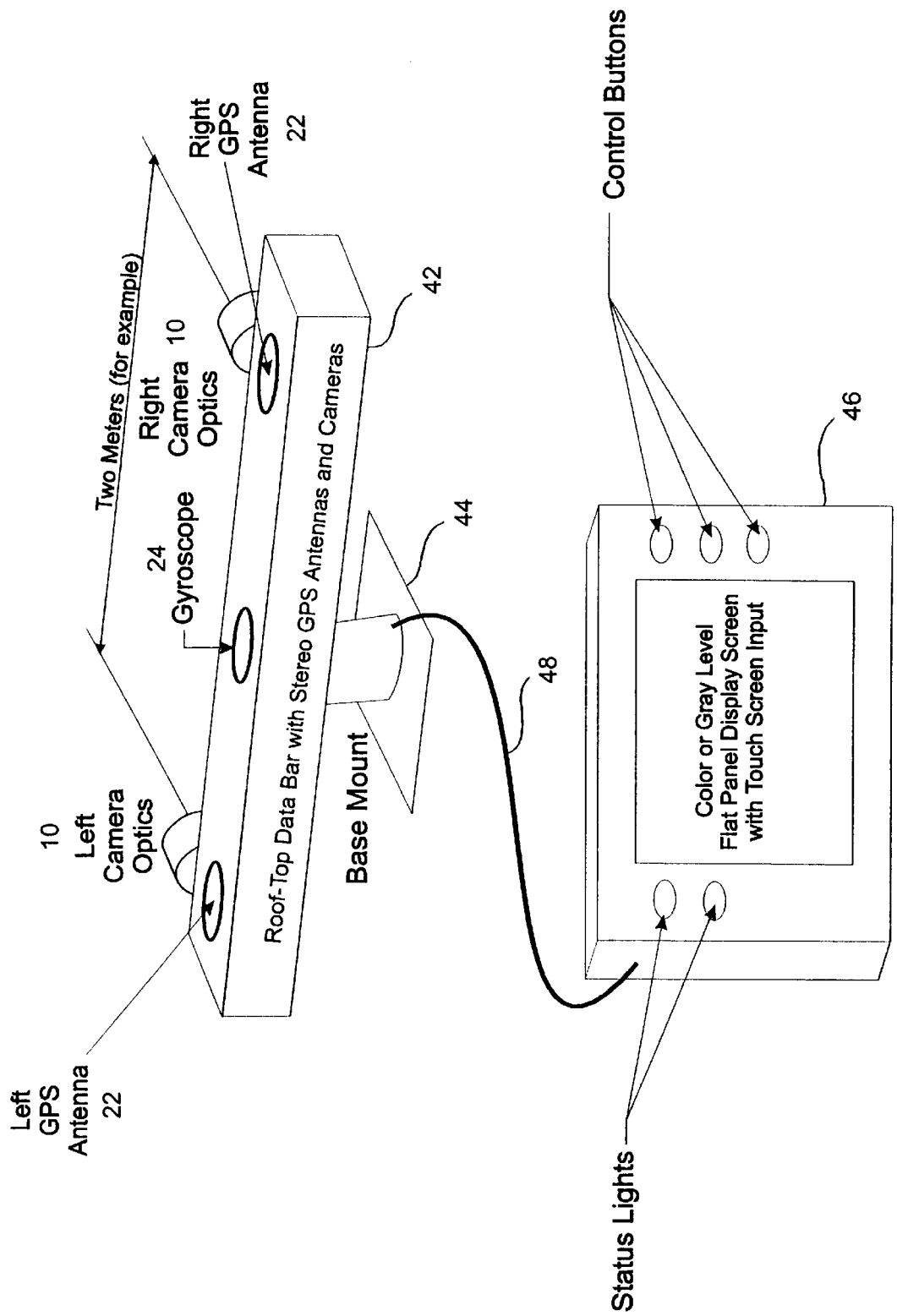
FIG. 16 is an illustration of a GDM which can be incorporated with a vehicle, in accordance with the subject invention.

Referring to FIG. 16, a specific embodiment of the subject invention is shown which can be used in a vehicle such as an automobile, boat, airplane, or helicopter. In this specific embodiment, two GPS antennas 22, two cameras 10 and 12, and a gyroscope 24 are incorporated into data bar 42 which can be mounted 44 on a vehicle by way of a base mount. Advantageously, this can allow a large spacing between cameras and, therefore, very accurate distance determinations. The data bar 42 is connected to a user interface 46 by a high speed data link 48. This data link 48 can be wired or wireless. The central processor unit can be located within the data bar with the user interface being a peripheral attachment, or the central processor unit can be in the user interface unit. The user interface unit can be mounted in the vehicle to free a user's hands or can be held by a user during use. Other combinations of components and mounting techniques can be readily designed and used by a person skilled in the art having the benefit of the instant disclosure.

In an alternative embodiment, a handheld user interface unit can have a gyroscope and two cameras with a GPS antenna being attached to a vehicle. A user can position the vehicle such that a GPS signal is available to provide the location of the GDM. Once the GDM position is known and the gyroscope in the hand held unit is calibrated, the user can approach objects in regions where a GPS signal may or may not be available, for example inside a building. The GDM can keep track of the movements of the GDM by data received from the gyroscope in order to assist in the determination of the position of imaged objects. This can enable the use of the subject GDM in environments where a useable GPS satellite signal is not necessarily available. In a specific embodiment, a set of accelerometers and a set of gyroscopes can provide dead reckoning position calculation where a reliable GPS signal is not necessarily available.

Another embodiment of the subject invention utilizes more than two cameras in order to provide enhanced spatial determination of an object. In another embodiment, the cameras of the subject invention can be moved to increase the distance between the lenses so as to enhance the accuracy of distance determinations, especially for objects located at a substantial distance from the GDM. The moveable camera lenses can be retractable to their original position for convenience. The camera may utilize wide-angle lenses for objects close to the GDM.

Cameras and/or camera lenses which are based on different parts of the spectrum, for example infrared, may also be utilized in accordance with the subject invention. In a specific embodiment, the camera may include an infrared sensor for heat detection. The GDM may be equipped with additional chemical and environmental sensors to augment the type and amount of data which can be gathered.

In a preferred embodiment, the GDM of the subject invention will have a real-time operating system to coordinate the essentially simultaneous collection of multiple types of data.

The connections and interfaces of the various components of the GDM of the subject invention can be designed and produced by one skilled in this art having the benefit of the teachings provided herein.

Following are examples which illustrate procedures for practicing the invention. These examples should not be construed as limiting.

EXAMPLE 1

Handheld Portable GDM

Figure 1:
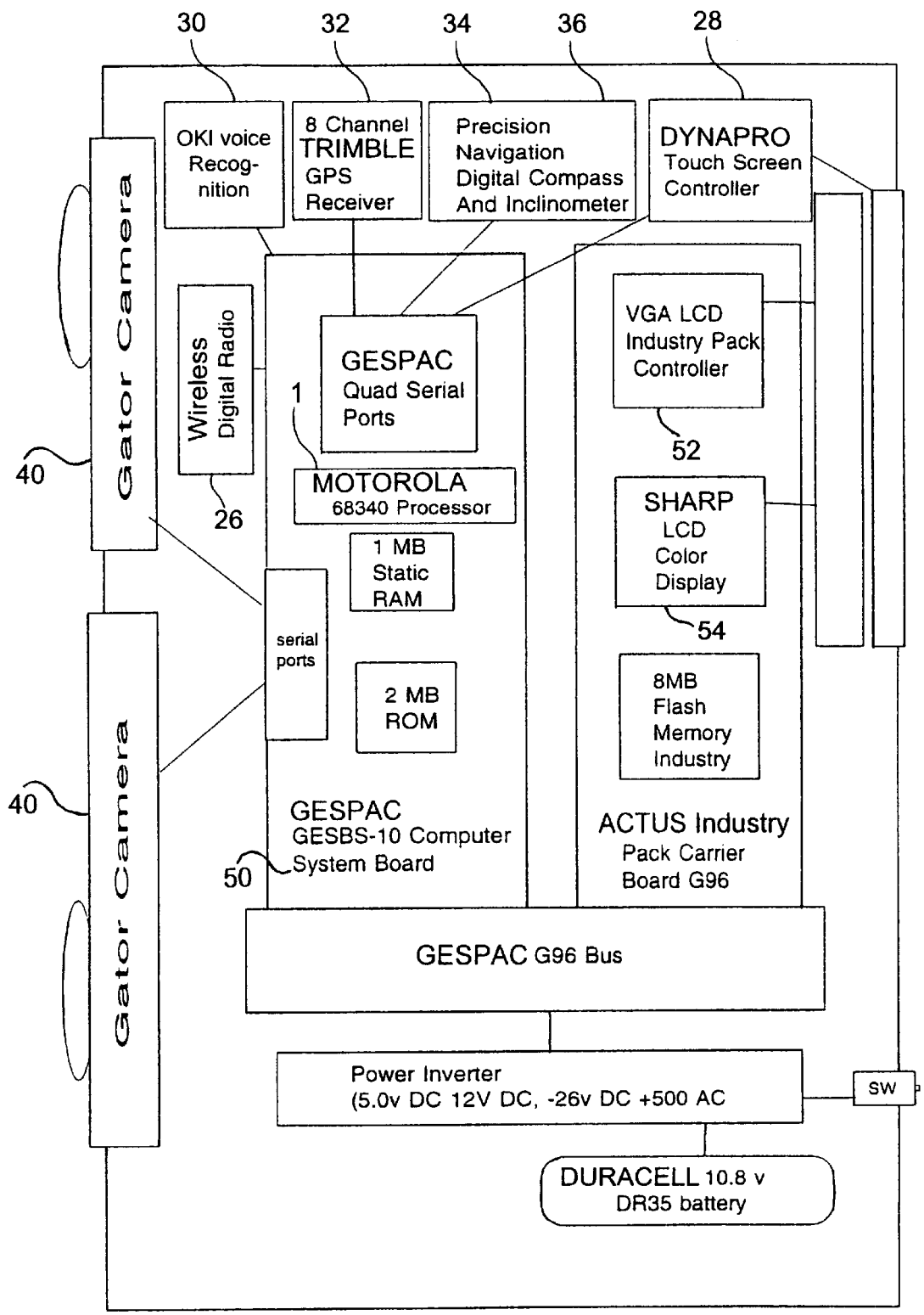
FIG. 1 is a block diagram showing the components of one embodiment of the device of the subject invention.
Figure 3:
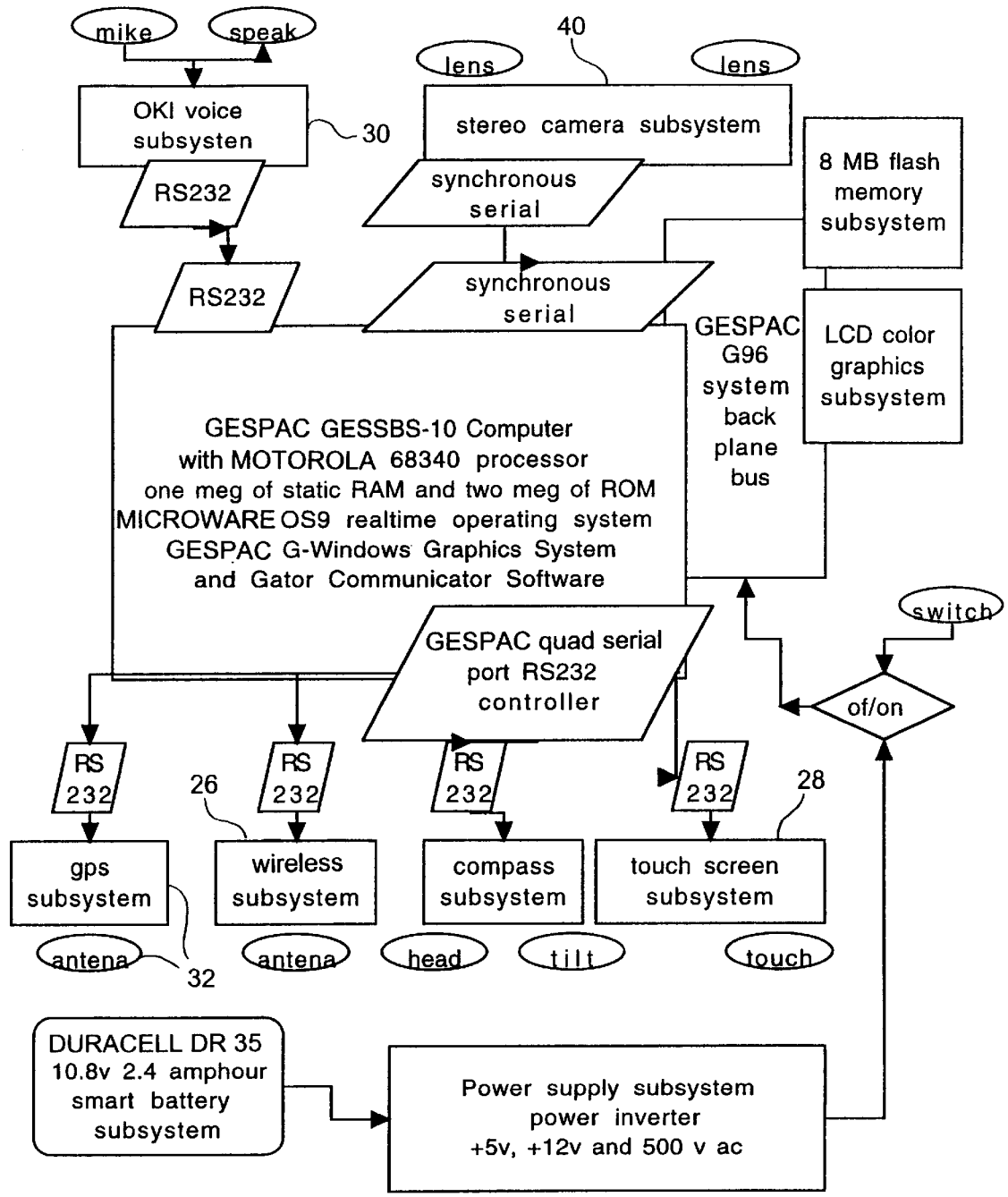
FIG. 3 is a schematic of the embedded controller processor system.

In a specific embodiment, referring to FIG. 1, the GDM of the subject invention can run MICROWARE'S OS-9 (OS-9 Version 3.0 Documentation, 1995 Microware Systems Corp., Des Moines, Iowa Dibble, Peter (1994) *Insights, An Advanced Programmers Guide to OS-9 3.0 Edition*, Microware Systems Corp., Des Moines, Iowa; Astec DC to DC converter, Astec America, Inc., Oceanside, Calif.; and Dayan, Paul S. (1992) *The OS-9 Guru: The Facts*, Galactic Industrial Limited, Durham, UK) embedded operating system from ROM. The heart of the computer is a Gespac SBSG8-10 50 (Gespac GWSSSS-10 Low Power CMOS MC 8340 Single Board System, 1995, Gespac Inc., Mesa, Ariz.; and Gespac Quad Asynchronous Serial Interfaces XSBSIO-2, 1995, GESPAC Inc., Mesa, AZ) with two megabytes of ROM and one megabyte of static RAM. It has a MOTOROLA 68340 CMOS low power processor 1 with six serial ports. See FIG. 3.

Figure 5:
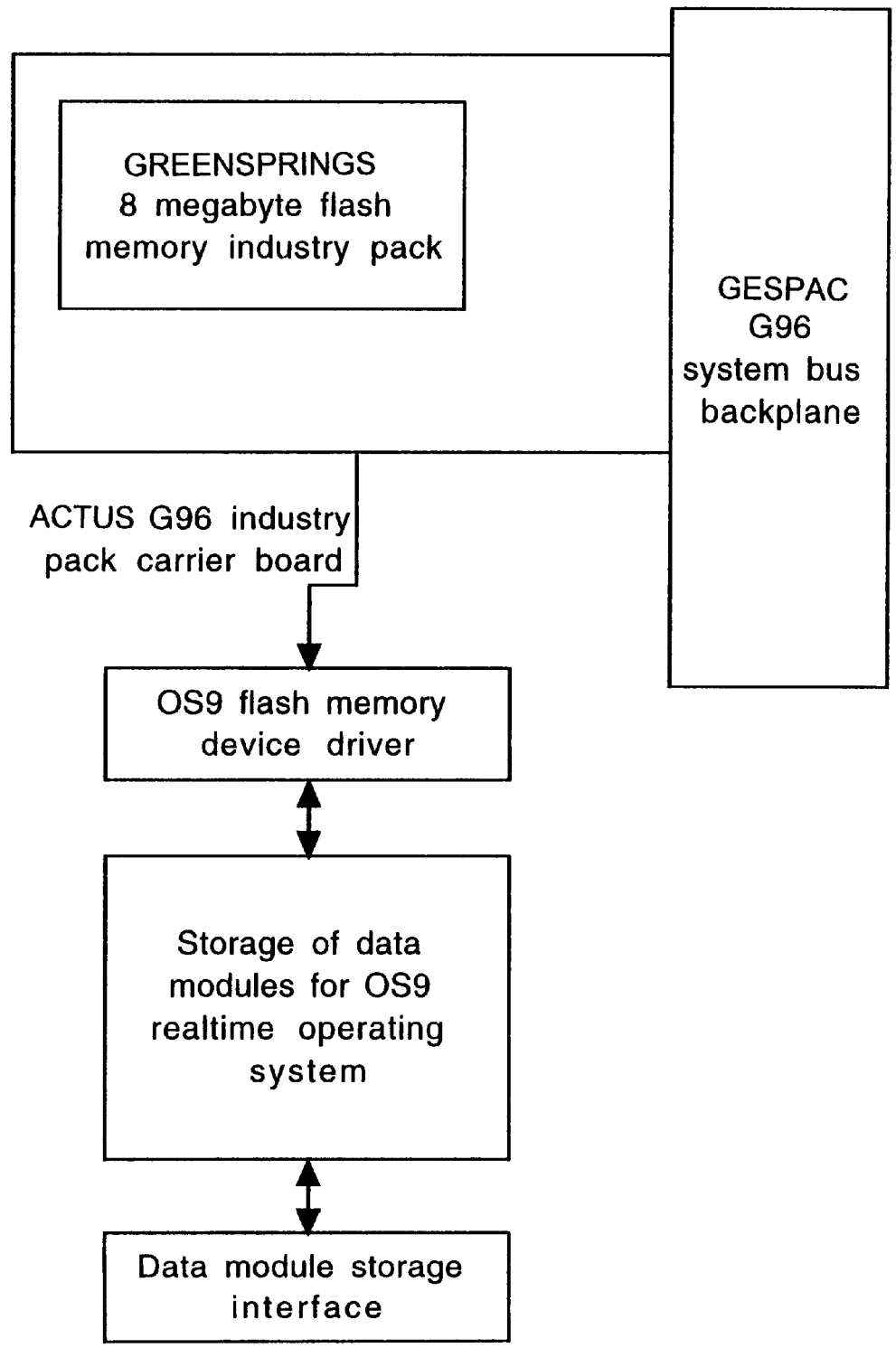
FIG. 5 is a schematic of the flash memory subsystem.
Figure 7:
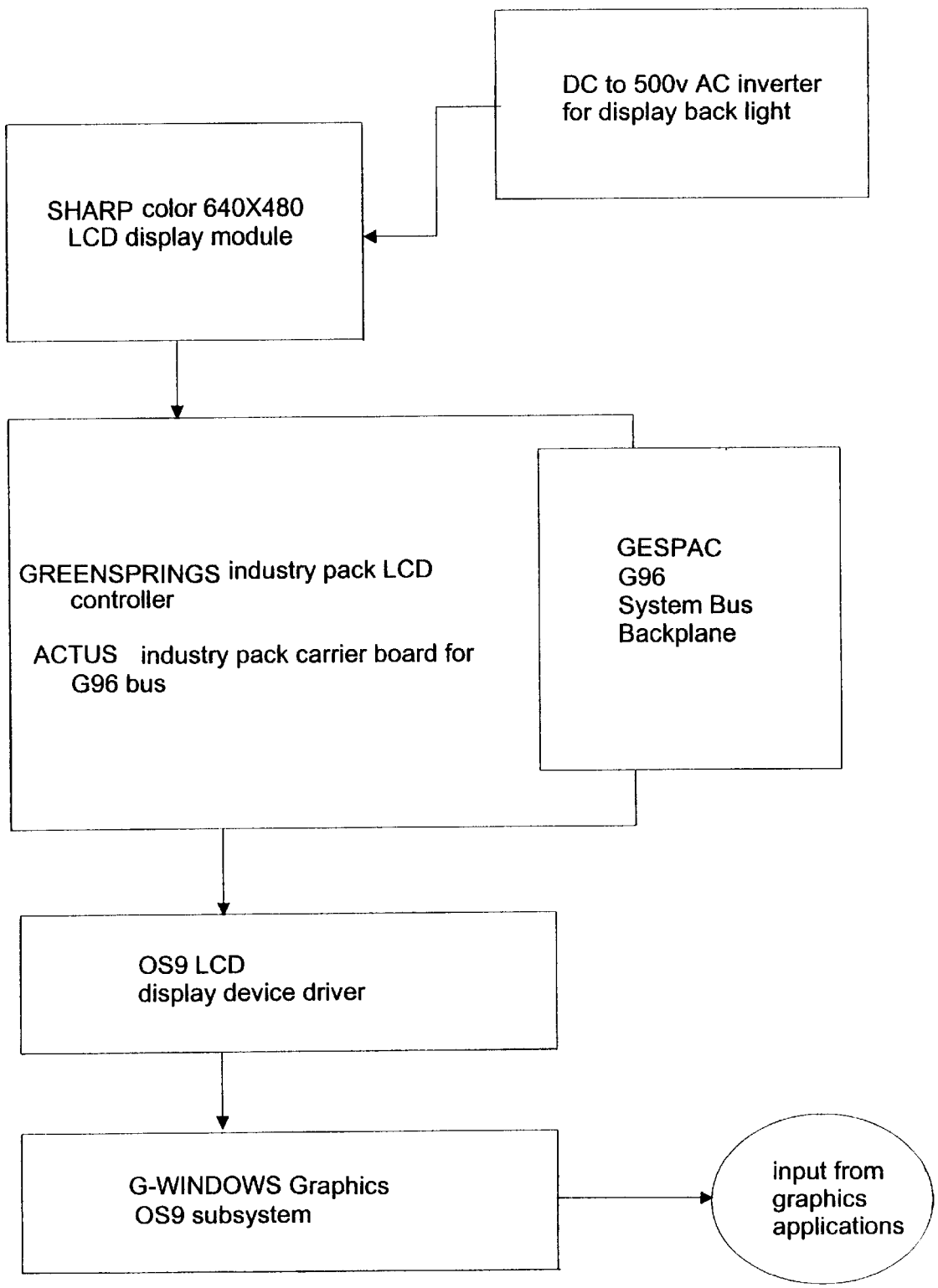
FIG. 7 is a schematic of the LCD display subsystem.

A small carrier board holds two industry pack modules. The first has a GREENSPRINGS IP-LCD VGA (Greenspring Computer IP-LCD VGA Industry Pack, 1995, Greenspring Computing Inc., Menlo Park, Calif.) controller 52 interfaced with a small SHARP 640×480 TFT active matrix flat panel color screen. The color screen 54 Sharp LQ64D142 TFT-LCD Module, 1995, Sharp Liquid Crystal Display Group, 1995, Camas, Wash. displays digital images, maps, and other data for verification and collection. See FIG. 7. The second industry pack module is a storage module with eight megabytes of flash memory. See FIG. 5.

Figure 8:
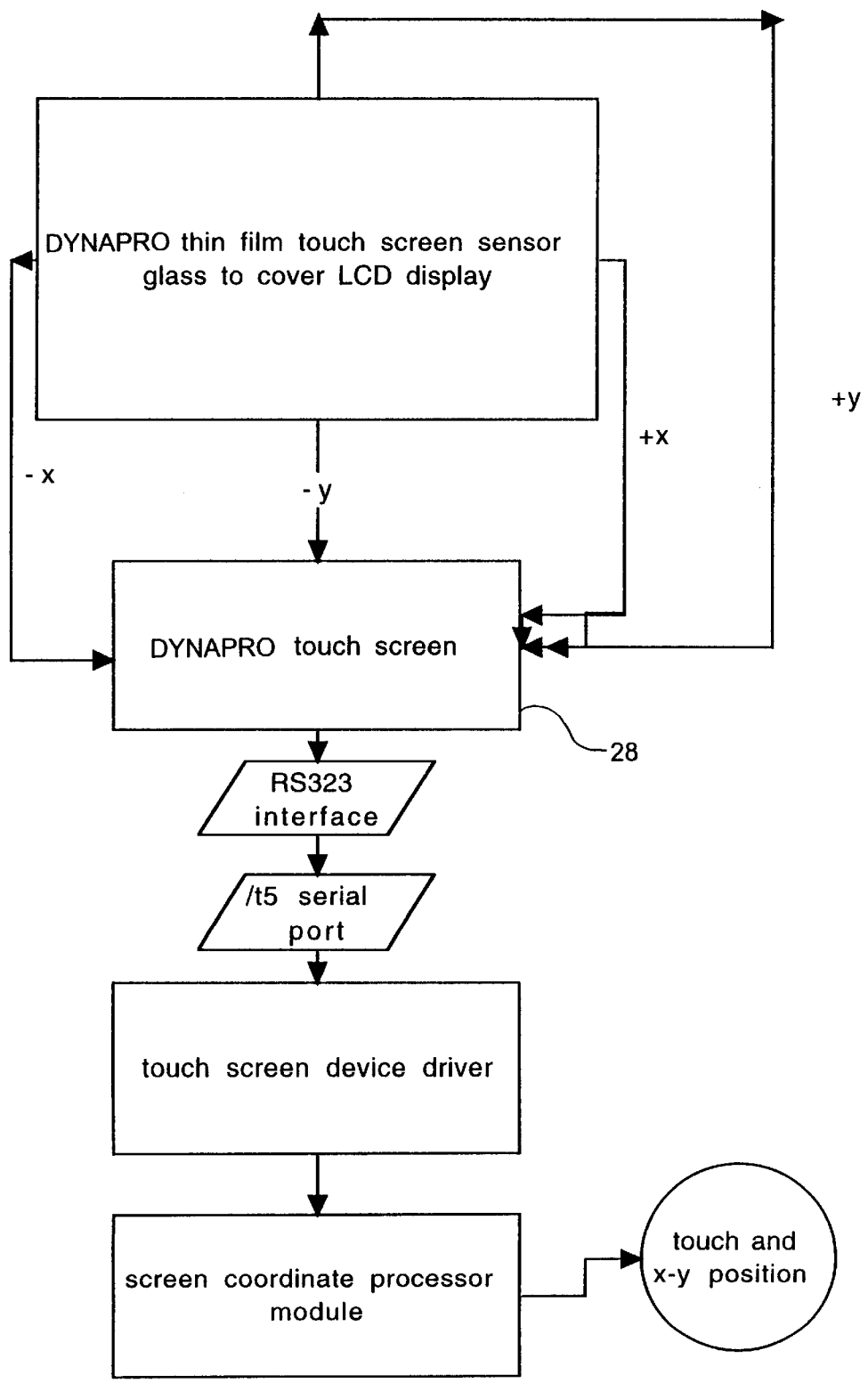
FIG. 8 is a schematic of the touch screen interface and module.
Figure 11:
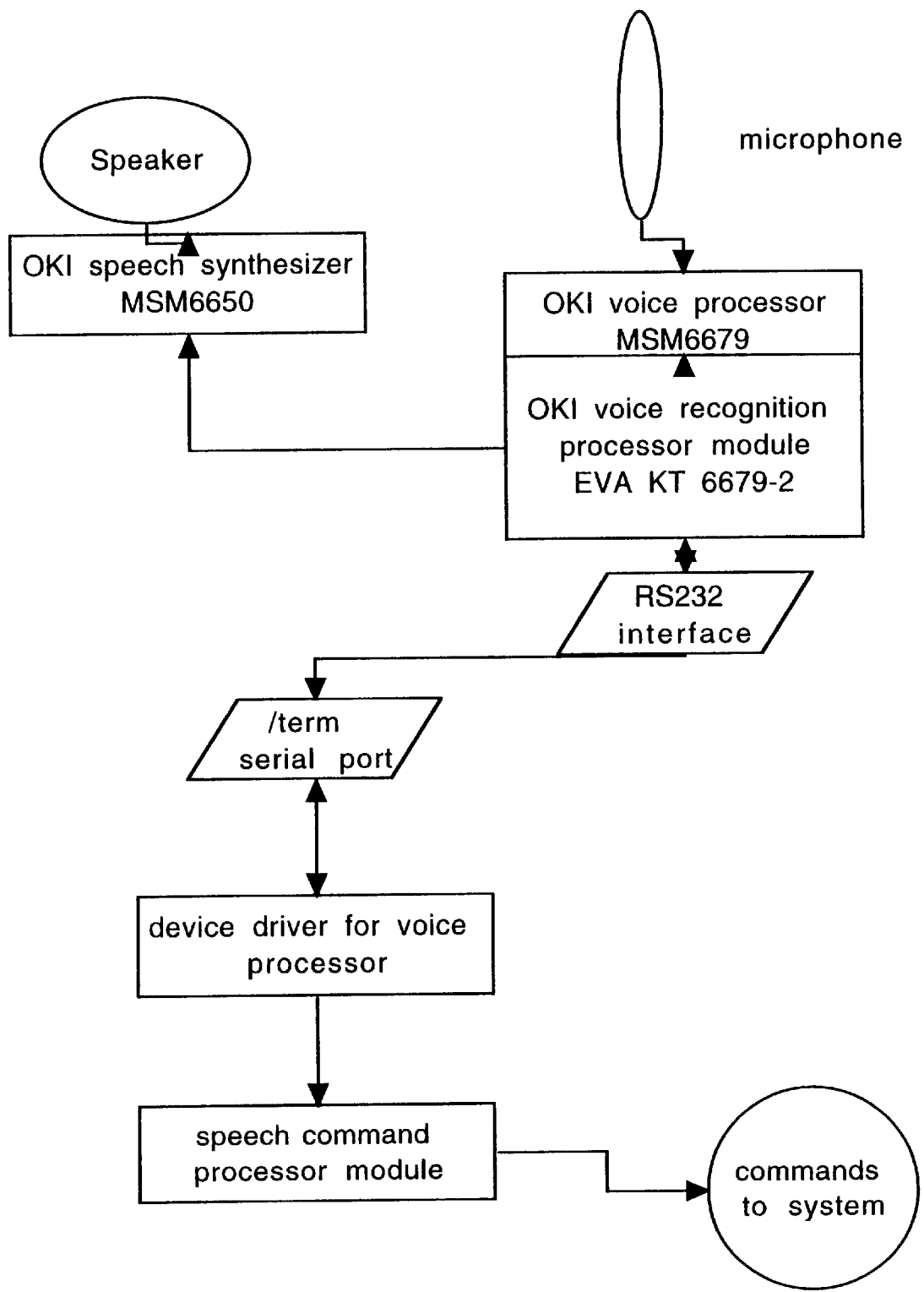
FIG. 11 is a schematic of the voice command subsystem.

The user interacts via a DYNAPRO touch screen (DYNAPRO SC3 Touch Screen Controller and Software Users Reference Version 1.1, 1995, DYNAPRO Thin Film Products) on the sixth serial port and/or via voice prompting and command provided by a OKI semiconductor voice control module connected to the first serial port. See FIGS. 8 and 11.

Figure 9:
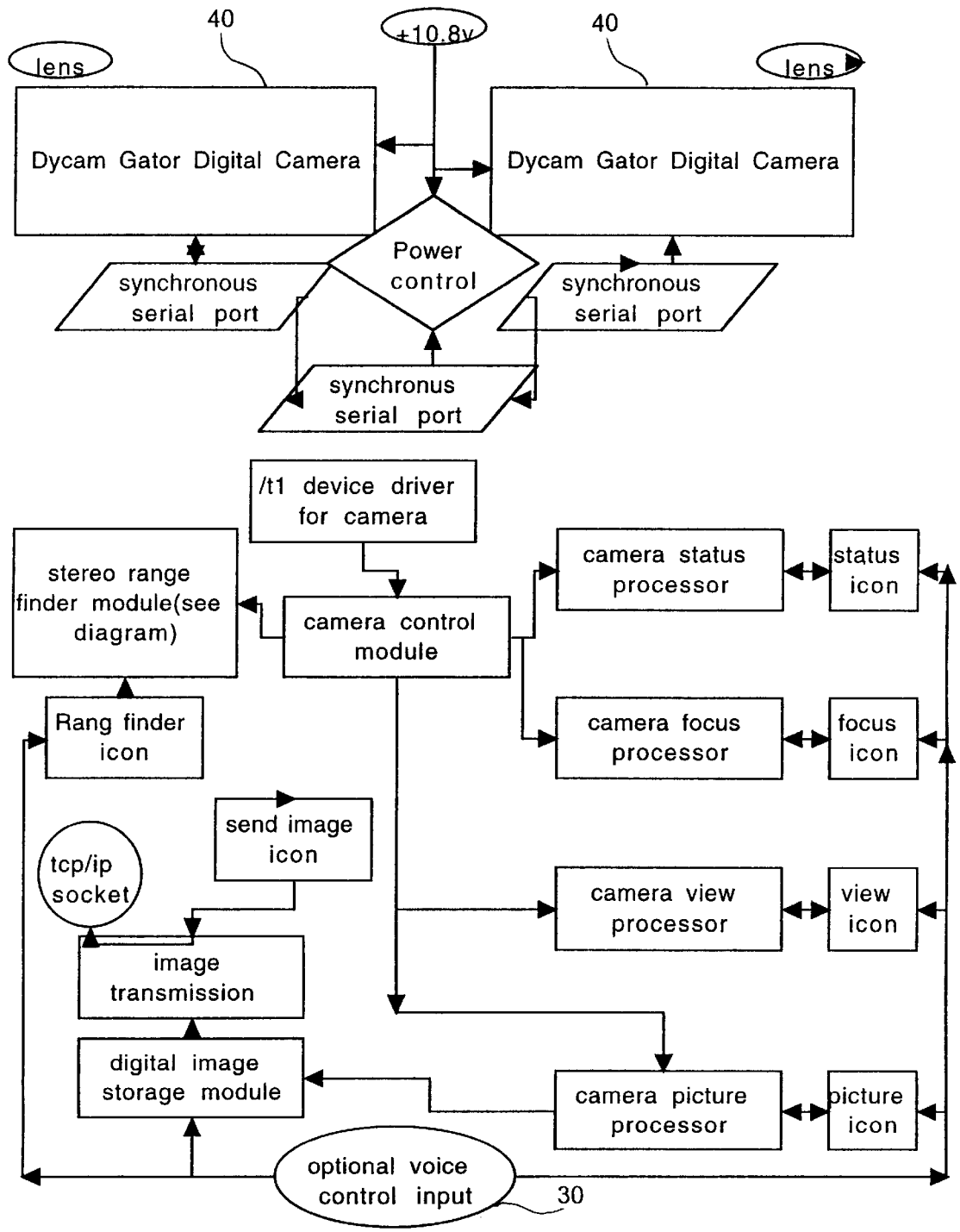
FIG. 9 is a schematic of the stereo digital camera subsystem.
Figure 10:
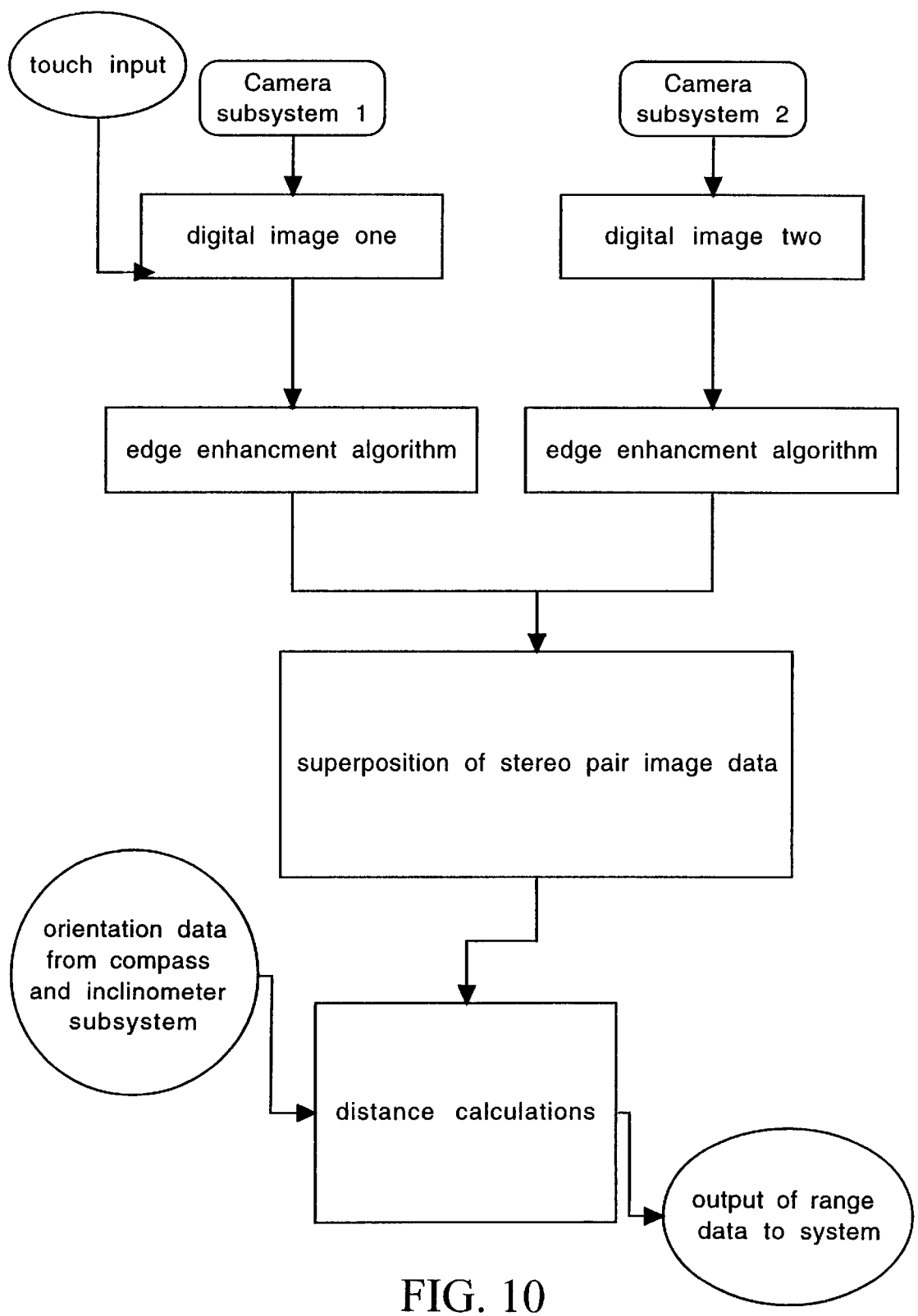
FIG. 10 is a schematic of the digital stereo range finder subsystem.

A stereo pair of Gator Digital cameras (Gator Digital Camera Users Guide and Reference, 1994, DYCAM, Chatworth, Calif.) are attached to the second serial port via a high speed synchronous connection. The two cameras provide stereo pairs of images for depth-of-field calculations and three-dimensional digitizing of objects of interest. See FIGS. 9 and 10.

Figure 6:
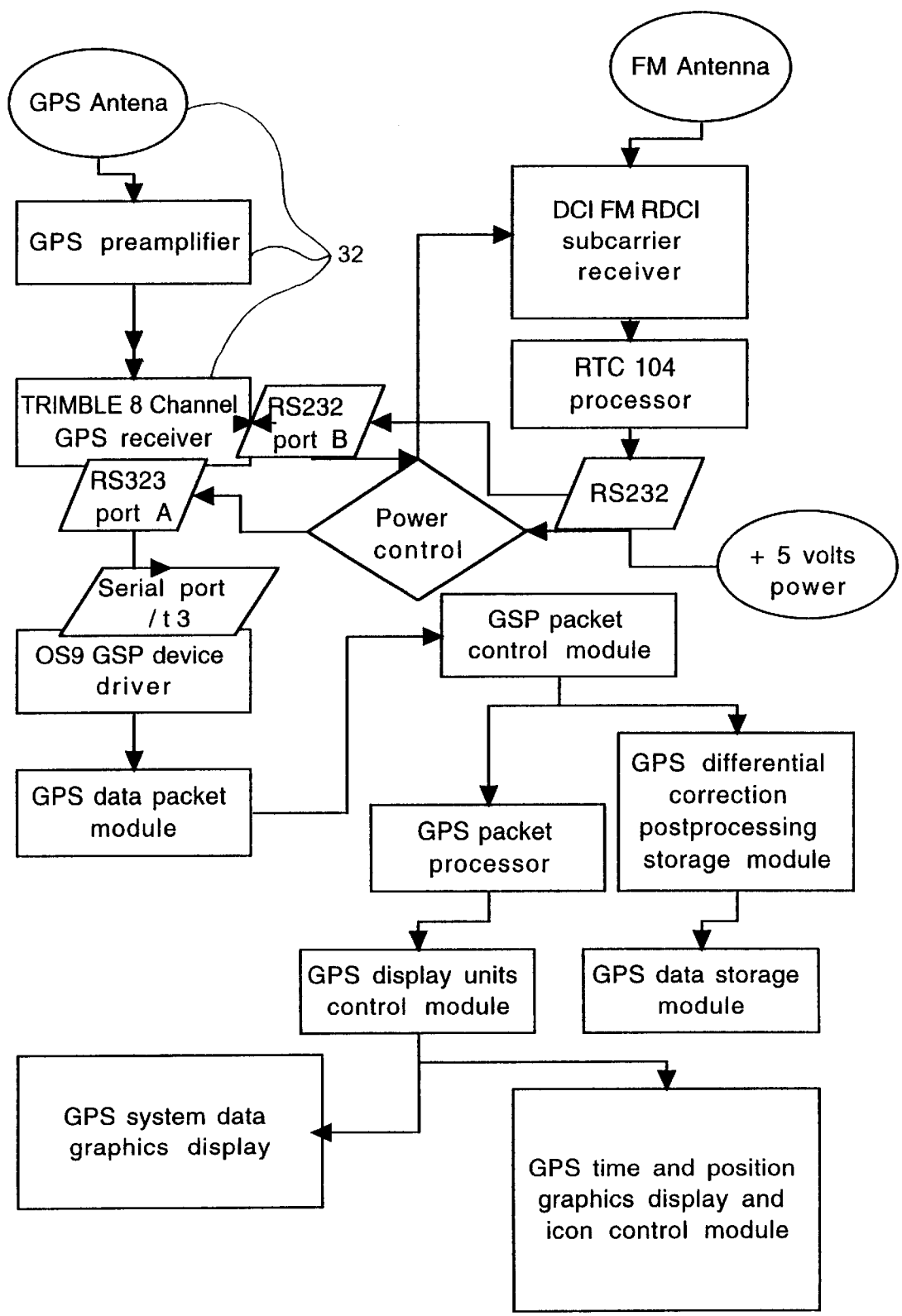
FIG. 6 is a schematic of the GPS receiver subsystem.

An eight-channel TRIMBLE GPS receiver (Trimble GPS Receiver, 1995, Trimble Navigation, Sunnyvale, Calif.) is on the third port. A DCI differential correction receiver which corrects the GPS data to 1–2 meter accuracy is connected directly to the GPS receiver. See FIG. 6.

Figure 4:
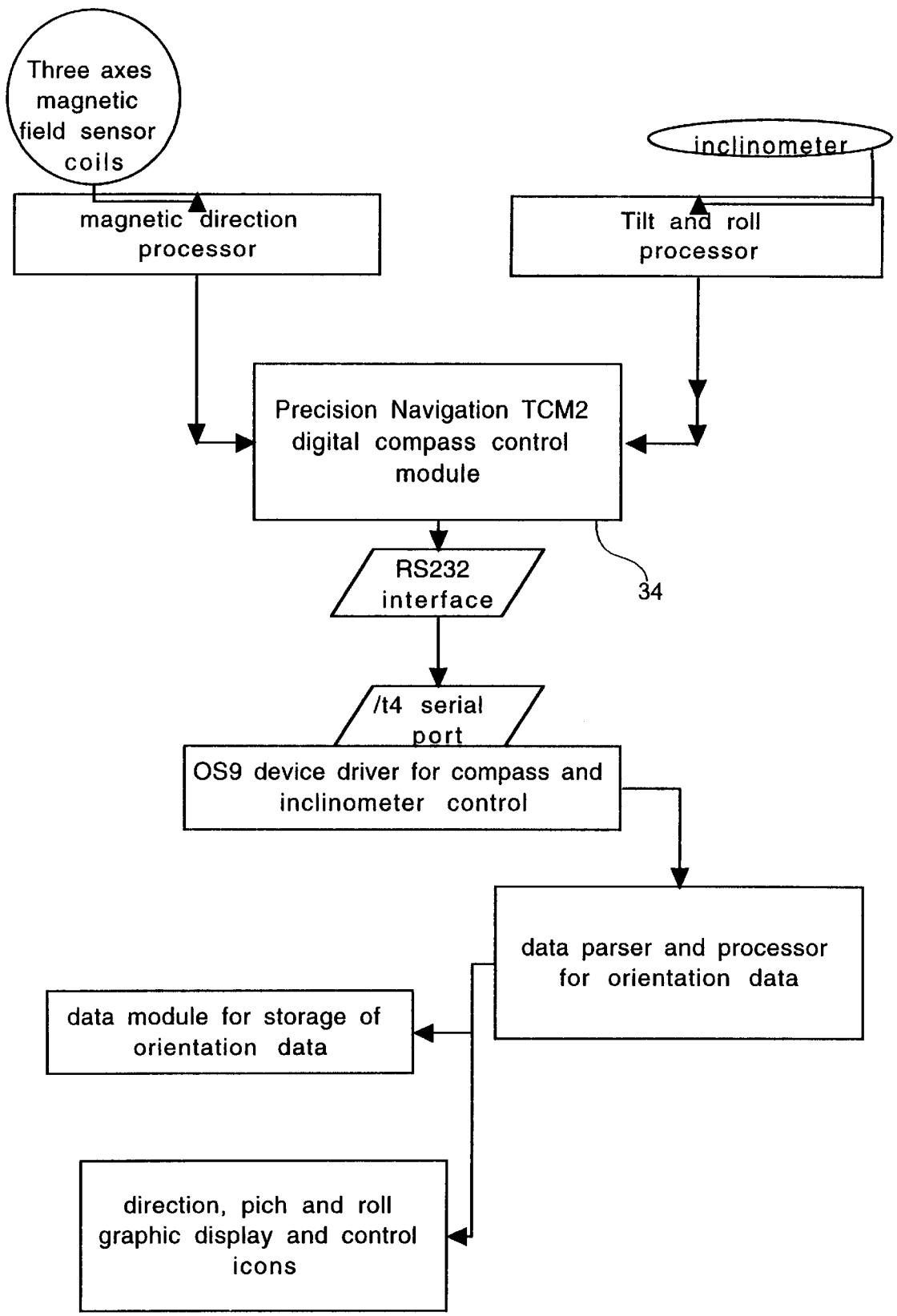
FIG. 4 is a schematic of the digital compass and inclinometer.

A PRECISION NAVIGATION digital compass unit provides direction, pitch, and roll, as well as temperature, on the fourth port (PRECISION NAVIGATION TCM2 Electronic Compass, 1994, Precision Navigation, Mountain View, Calif.). See FIG. 4.

Figure 12:
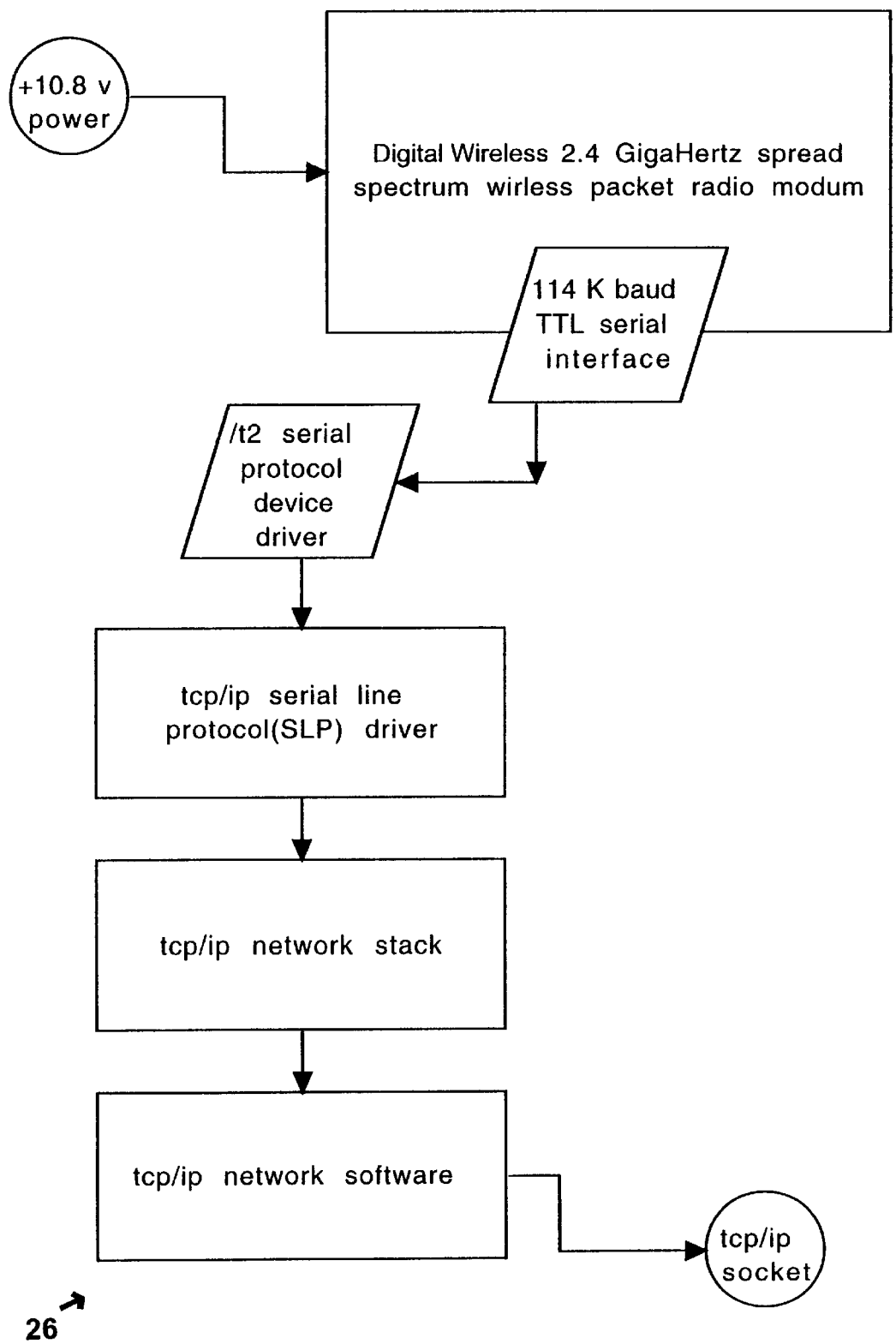
FIG. 12 is a schematic of the wireless network interface.

Another port is used for communication using a Digital Wireless spread spectrum which communicates at distances of up to one mile line-of-sight. The wireless packet radio link uses the tcp/ip protocol for compatibility with sending and receiving data over the Internet. See FIG. 12.

The graphical user interface can be based on G-WINDOWS (G-WINDOWS and G-VIEW Developers Manual, 1995, Gespac S. A., Geneva). G-WINDOWS can run completely from ROM and provides an effective interface. G-VIEW, a widget builder, is used for constructing object-oriented widgets to control the data sensors. The touch-sensitive color screen is used to display color and black-and-white digital images of objects under study and is used in the object documentation process. Objects are digitized by translating the GPS location of the data mapper to the object. The distance is calculated from the user touching the object of interest in the digital image and the computer automatically finding the same pattern in the stereo pair image. Bearing and orientation are calculated from the compass and inclinometer reading.

When in voice command and control mode, the system verbally prompts the operator for input and flashes the appropriate icon when the voice command from the user is processed. This leaves the operator's hand free for other tasks. The voice command and control also aids in poor visibility situations and for users with visual handicaps.

EXAMPLE 2

Measurement of Remote Objects

Objects of interest can be measured in the field by touching two points on one picture and letting the system calculate a three dimensional coordinate for each point from the direction, pitch, and roll data, lens characteristics and lens spacing. Distance between points can be calculated. All of the data is stored with the stereo pair of images for future processing with similar software on a desktop computer and/or if the user desires to capture more detailed information from the photo.

EXAMPLE 3

Three Dimensional Digitizing of Objects

As the user points the data collector unit in the direction of an object of interest the GPS is providing location coordinates, the system is also monitoring the direction pitch and roll of the stereo pair of cameras. Once the relative three dimensional coordinate for the object under study is calculated from the stereo data and the three dimensional heading of the camera the actual location of the object is calculated and recorded.

EXAMPLE 4

Mapping Objects in the Field

The coordinate derived for the objects located in the stereo pairs of images is used to construct a geographic information system map layer. Each object can have attribute data stored with it including a photo of the object, its dimensions, and other attribute data the user desires to include. For example a verbal description can be digitized by the voice processor for a tag attribute or an icon driven system can be used to capture field observations.

EXAMPLE 5

Special Processing of Pictures

Each stereo pair of pictures has location and directional data stored with it thus the plane of the photograph is known. This makes it possible to correct the picture for orientation. For example if the picture was taken at an angle the image can be rotated to remove the tilt in the picture. Also a floating scale is placed on the surface of an object in a picture so dimensions can be directly read off by the user. The units on the scale are automatically set from the information obtained from processing the stereo images and their associated data.

EXAMPLE 6

Field Correction of Existing Geographic Information System Data

Existing data is corrected in the field by loading an existing map data set on to the system. The user takes the map into the field. As features on the map are photographed the user touches the object on the map and the same one in the stereo pair of pictures. The system automatically calculates the displacement to the object and translates the GPS coordinate of the handheld data mapper to the object. This new accurate coordinate is then used to update the old feature coordinates including adding an altitude coordinate.

EXAMPLE 7

Generation of Three Dimensional Wire Frame Sketches

Several algorithms are used to enhance the edges of objects of interest. For example the lapse transform of an image will highlight the edges of an object in the picture. These algorithms are used to assist the calculation of the displacement measurement of the image pairs of the same objects in the stereo pair of digital photographs. Once the images are highlighted the system can then generate a wire frame three dimensional model for the object under study. In complex situations the user could take several pairs of images from different sides of the object under study. A more complete digital three dimensional map and model of the object is then constructed from the data.

Example 8

GDM Utilizing the Motorola 821 Power PC Processor

Figure 13:
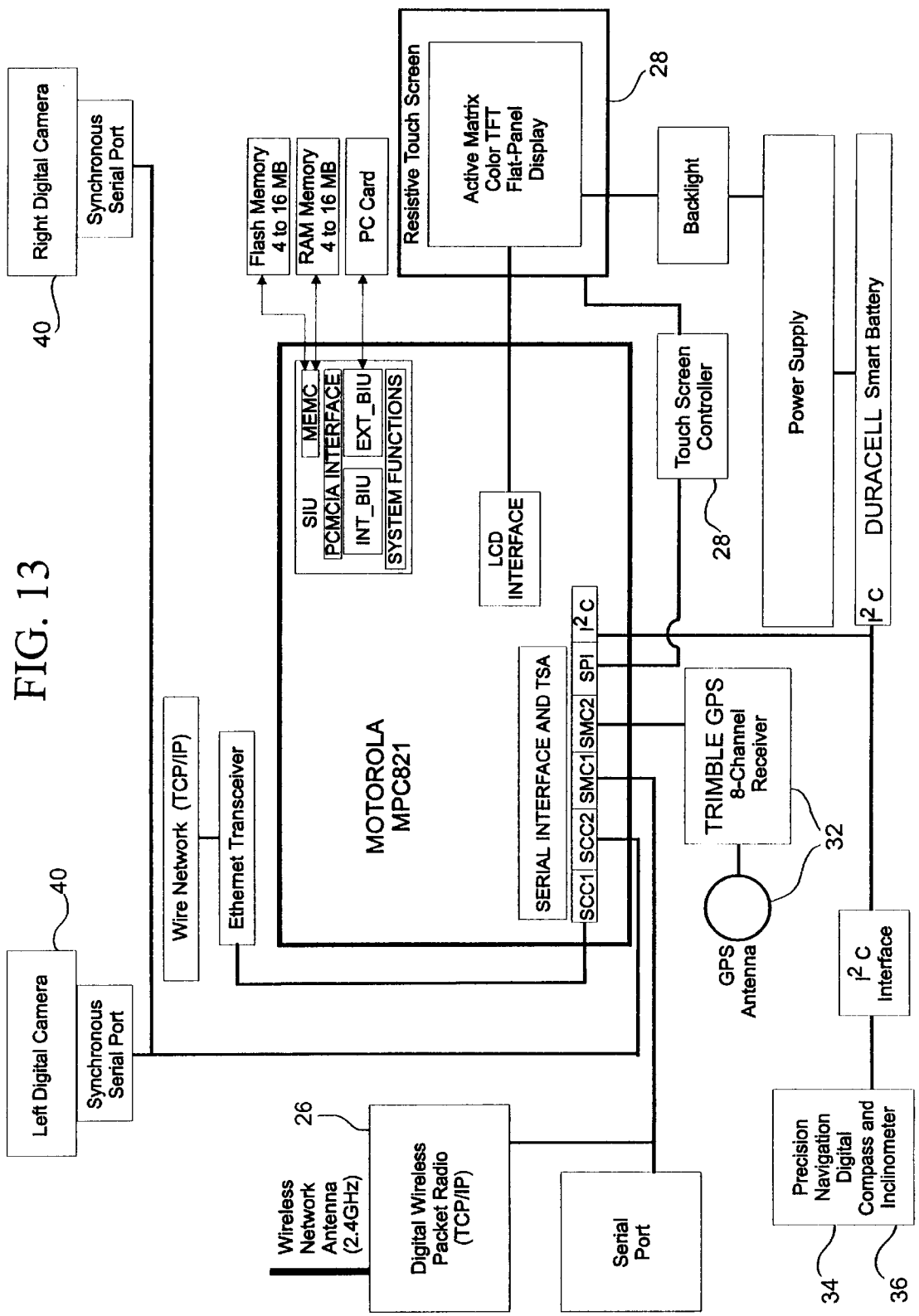
FIG. 13 is a block diagram of an embodiment of a GDM in accordance with the subject invention.

Referring to FIG. 13, in another specific embodiment of the subject invention, a GDM was developed around the highly integrated MOTOROLA 821 Power PC processor. This microprocessor has interfaces to PC-card (PCMCIA), RAM memory, flash memory, and LCD display, as part of the chip. The GDM PC-card, RAM memory, flash memory, and LCD display are connected directly to the 821 PPC chip via the respective built in controllers and logic. Some of the advantages of using this processor are low power, small size, and lower cost. Many types of devices can be inserted in the PC-card slot however the most frequent use is to use a solid state hard disk drive to store maps, digital images, and associated data.

The MOTOROLA MPC821 also has a six-channel high speed communication processor. The first channel (SCC1) is connected to an Ethernet transceiver which connects directly to Ethernet local area networks for in office use. The second communication port (SCC2) provides a five megabit synchronous interface to the two DYCAM Gator digital cameras which have a high speed synchronous port provided by their integral digital signal processor (TEXAS INSTRUMENTS TMS320cx). The third port (SMC 1) is switched between providing a local serial port and the 2.4 gigahertz spread spectrum two-way digital packet radio. The fourth port (SMC2) is interfaced to a TRIMBLE eight-channel GPS receiver. The fifth channel serial peripheral interface (SPI) is connected to the touch screen controller which provides for user input by touching an LCD panel with a stylus or a finger. The sixth communication port uses the 12C interface (I2C). I2C provides a simple internal network which provides interface to the DURACELL DR35 smart battery's 12C port, and the 12C serial interface connected to the PRECISION NAVIGATION digital compass and inclinometer. When a second GPS receiver is used, the I2C also provides a convenient interface.

Figure 14:
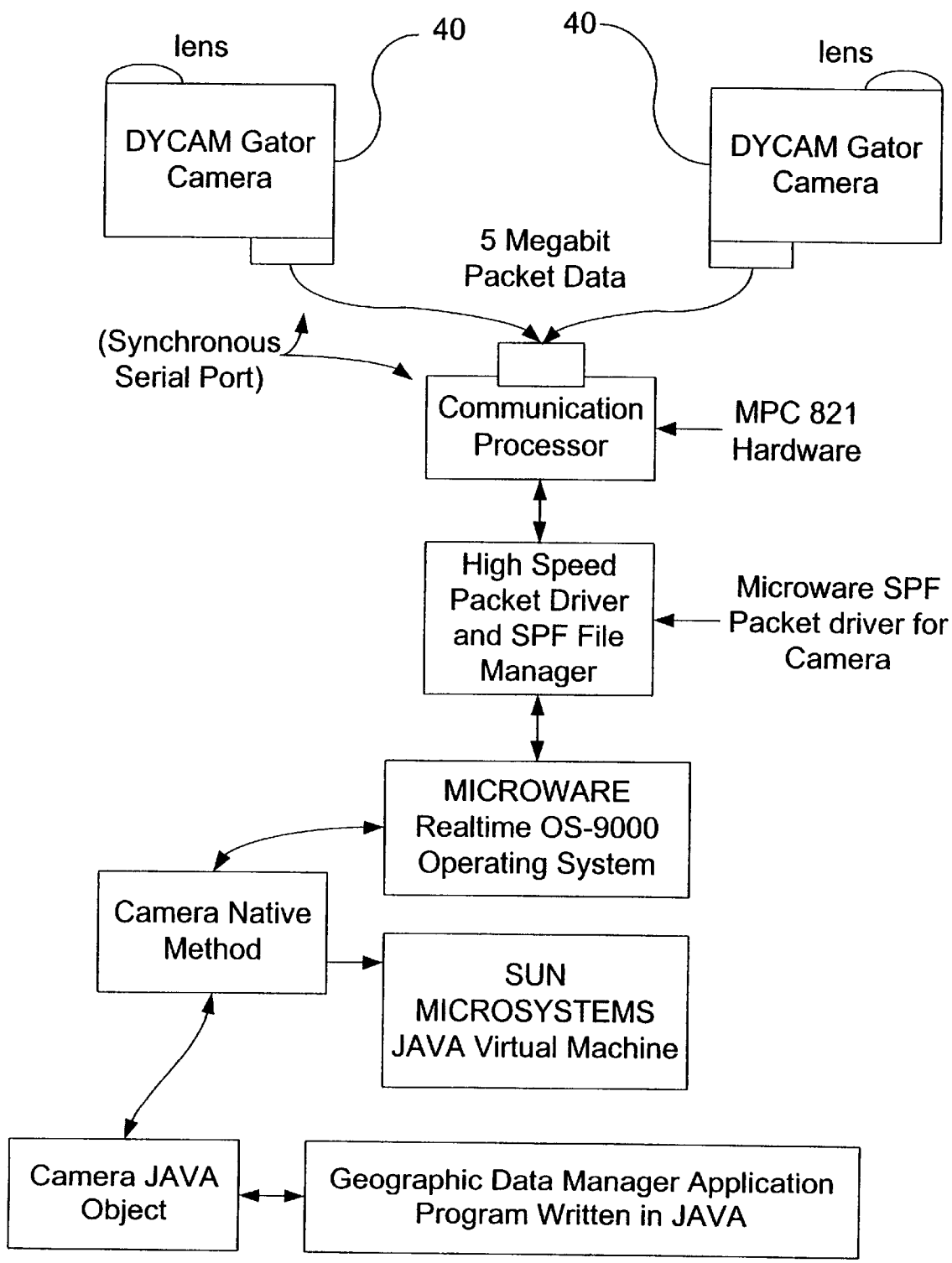
FIG. 14 is a diagram of object oriented control of a camera subsystem as a JAVA native method, in accordance with the subject invention.

The core software for the GDM computer is provided by the MICROWARE OS9000 real time operating system for the Power PC. Device drivers support the interface to all the components attached to the communication channels as well as the LCD graphic display and the PC-card slot. TCP/IP network software provides wired and wireless network interface to the Internet. Sun Microsystems JAVA virtual machine is used to enhance the network features of the GDM. Java classes are provided for each of the major devices which make up the GDM. For example there is a camera class, a compass and inclinometer class, a battery class, and a GPS class. Each of these classes have JAVA native methods written in C or C++ to provide low level access to the data sensors and to do some processing. FIG. 14 is a flow diagram of the Camera Class. All of the graphics interface the user sees is written in JAVA, and can be download over the network connection. For a GDM application to take a picture, the application first uses the Camera class to create a camera object which then can be passed messages. For example to capture a stereo pair of digital images the "takePicture" message is sent to the camera object.

Figure 15:
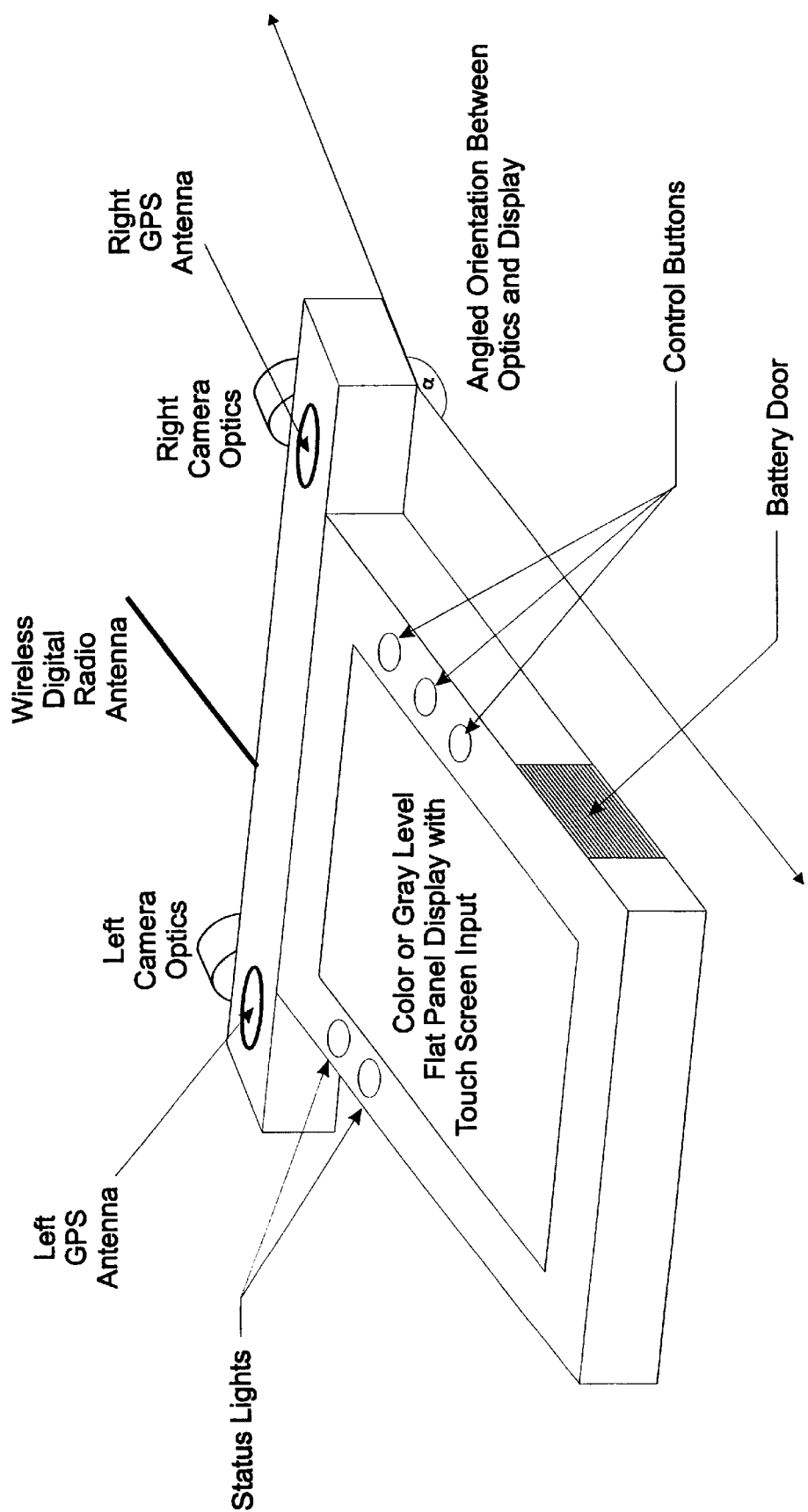
FIG. 15 is an illustration of a handheld GDM, in accordance with the subject invention.

FIG. 15 provides a representation of a hand-held version of the GDM which is implemented with the system described above. In FIG. 15, stereo cameras and stereo GPS receivers are shown. The GPS antennas are mounted at right angles to the lenses on a platform which is attached to the core hand-held computer module at angle a, preferably approximately 150 degrees. This design makes it more convenient for the user to view images on the screen (live view finder) while taking a picture. FIG. 16 illustrates an embodiment of the subject GDM where the stereo GPS and stereo cameras are mounted on a structure which is separate from the user interface. This embodiment is useful in situations where the GDM is used with a vehicle. The structure housing the GPS antennas and cameras can be mounted to the exterior of the vehicle and the computer display module can be mounted to the interior of the vehicle or designed for hand-held use.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A device for gathering position data, comprising:
   a position means for providing the position of said device,
   an imaging means for imaging an object, wherein said imaging means comprises two digital cameras, wherein processing data from both cameras provides the distance from said device to an imaged object, and
   a processing means, wherein said processing means can receive and process data from the position means and data from the imaging means in order to provide position data for an imaged object.

2. The device, according to claim 1, wherein said position means comprises a receiver based on a satellite positioning system.

3. The device, according to claim 2, wherein said position means comprises at least one GPS receiver.

4. The device, according to claim 3, wherein said position means comprises at least two GPS receivers.

5. The device, according to claim 1, wherein said position means is a receiver based on a ground based positioning system.

6. The device, according to claim 1, further comprising a heading means for providing a heading of said device.

7. The device, according to claim 6, wherein said heading means is a digital compass.

8. The device, according to claim 6, wherein said heading means is at least two GPS receivers.

9. The device, according to claim 1, further comprising a user interface means for user interaction with the device.

10. The device, according to claim 1, further comprising a pitch means for providing a pitch of said device.

11. The device, according to claim 10, wherein said pitch means is an inclinometer.

12. The device, according to claim 10, wherein said pitch means of said device is a gyroscope.

13. The device, according to claim 10, wherein said pitch means is at least two GPS receivers.

14. The device, according to claim 10, further comprising a roll means for providing a roll of said device.

15. The device, according to claim 14 wherein said roll means for providing a roll of said device is an inclinometer.

16. The device, according to claim 14, wherein said roll means is a gyroscope.

17. The device, according to claim 14, where said roll means is at least two GPS receivers.

18. The device, according to claim 9, wherein said user interface means is selected from the group consisting of a flat panel display with touch screen, voice interaction, pen commands, and a keyboard.

19. The device, according to claim 1, comprising at least three GPS receivers, wherein data from said three GPS receivers provides a position, a heading, a pitch, and a roll of said device.

20. The device, according to claim 19, wherein data from said two cameras combined with data from the three GPS receivers provides three dimensional position data of an imaged object.

21. The device, according to claim 1, further comprising a means for wireless communication with a remote host computer.

22. The device, according to claim 1, wherein said processing means processes position data of imaged objects such that the position relation of two imaged objects is provided.

23. The device, according to claim 1, further comprising at least one gyroscope, wherein said gyroscope provides data related to information, selected from the group consisting of heading of the device, pitch of the device, and roll of the device, and wherein said gyroscope can be calibrated from data received from a GPS satellite while said device is moving.

24. The device, according to claim 1, wherein said device is incorporated with a vehicle.

25. The device, according to claim 24, wherein imaging means can be removed from the vehicle while said position means remains affixed to the vehicle, and wherein said device further comprises a means for providing data with respect to the imaging means' position relative to the position means' position, such that the position of the imaging means can be determined from the position of the position means and the data with respect to the imaging means' position relative to the position means' position.

26. The device, according to claim 25, wherein said means for providing data with respect to the imaging means' position relative to the position means' position comprises at least one gyroscope.

27. The device, according to claim 24, wherein said device comprises at least two GPS antennas, at least two cameras, and at least one gyroscope mounted to the vehicle.

28. The device, according to claim 26, wherein once the vehicle is position in a region where the device's position means functions correctly such that the device's position is determined, the gyroscope can be calibrated and the imaging means can then be used in regions where the position means does not correctly function.

29. The device, according to claim 25, wherein said means for providing data with respect to the imaging means' position utilizes dead reckoning position calculation.

30. The device, according to claim 1, wherein said imaging means is based on a non-visible portion of the light spectrum.

31. The device, according to claim 1, further comprising at least one sensor selected from the group consisting of: a chemical sensor, a heat sensor and an environmental sensor.

32. The device, according to claim 1, wherein said imaging means comprises at least three cameras.

33. The device, according to claim 1, wherein at least one of said two cameras is movable such that the distance between the cameras can be adjusted.

34. The device, according to claim 1, wherein images produced by the cameras are compared to determine a distance apart the imaged object is in the images produced by the cameras, and wherein the distance apart the imaged object is in the images produced by the cameras is used to determine the distance from said device to the imaged object.

35. The device, according to claim 34, wherein the distance from said device to the imaged object is determined from the distance apart the imaged object is in the images produced by the cameras according to the following equation:

$$d_o = \frac{fd_c}{d_i}$$

where $d_o$ is the distance to the imaged object, $d_c$ is a spacing between cameras, $d_i$ is the distance apart the imaged object is in the images produced by the cameras, and f is the focal length of the cameras lenses.

36. The device, according to claim 34, wherein enhancement of the imaged object's edges is utilized in the determination the distance apart the imaged object is in the imaged produced by the cameras.

37. The device, according to claim 1, wherein said position means comprises a map display, wherein a user designates the location of said device with respect to the map display.

38. The device according to claim 1, wherein said cameras are rotated such that each points toward the object.

* * * * *

UNITED STATES PATENT AND TRADEMARK OFFICE
CERTIFICATE OF CORRECTION

PATENT NO. : 6,083,353
DATED : July 4, 2000
INVENTOR(S) : John F. Alexander, Jr.

It is certified that error appears in the above-identified patent and that said Letters Patent is hereby corrected as shown below:

Column 7, line 30: "GPS" should read --GPS 32--.

Column 9, line 18: "10 optics" should read --optics 10--.

Column 11, line 52: "Gespac" should read --GESPAC--.

Column 14, line 30: "gigahertz" should read --gigaHertz--.

Column 14, line 39: "12C port, and the 12C serial" should read --I2C port, and the I2C serial--.

Column 15, line 40 (claim 5): "means is a receiver based" should read

--means is based--.

Signed and Sealed this

Twenty-ninth Day of May, 2001

*Attest:*

NICHOLAS P. GODICI

*Attesting Officer*   Acting Director of the United States Patent and Trademark Office